United States Patent
Abedini et al.

(10) Patent No.: US 12,160,884 B2
(45) Date of Patent: Dec. 3, 2024

(54) TECHNIQUES FOR RESOURCE CONFIGURATIONS BASED ON CHANNEL METRICS

(71) Applicant: QUALCOMM Incorporated, San Diego, CA (US)

(72) Inventors: Navid Abedini, Basking Ridge, NJ (US); Qian Zhang, Basking Ridge, NJ (US); Kapil Gulati, Belle Mead, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 17/404,871

(22) Filed: Aug. 17, 2021

(65) Prior Publication Data

US 2023/0055885 A1    Feb. 23, 2023

(51) Int. Cl.
*H04W 72/542* (2023.01)
*H04B 7/26* (2006.01)
*H04W 72/21* (2023.01)
*H04W 72/23* (2023.01)
(Continued)

(52) U.S. Cl.
CPC ........ *H04W 72/542* (2023.01); *H04B 7/2643* (2013.01); *H04W 72/21* (2023.01); *H04W 72/23* (2023.01); *H04W 72/51* (2023.01); *H04W 72/541* (2023.01)

(58) Field of Classification Search
None
See application file for complete search history.

(56) References Cited

U.S. PATENT DOCUMENTS 10,757,563 B1 * 8/2020 Humbert .................. H04L 5/14
2018/0020363 A1    1/2018 Faxér et al.
2019/0349904 A1 * 11/2019 Kwak .................. H04L 69/324
(Continued)

FOREIGN PATENT DOCUMENTS

WO    WO-2013056394 A1    4/2013

OTHER PUBLICATIONS

International Search Report and Written Opinion—PCT/US2022/073943—ISA/EPO—Oct. 18, 2022.

*Primary Examiner* — Jenkey Van
(74) *Attorney, Agent, or Firm* — Dalei Dong; Holland & Hart LLP

(57) ABSTRACT

Methods, systems, and devices for wireless communications are described. A user equipment (UE) may transmit signaling to a first network entity indicating a location of the UE and a measured reference signal receive power (RSRP). The UE may receive an indication of a time division duplex (TDD) configuration and a slot format indicator (SFI) for communications between the UE and the first network entity based on the RSRP or location. In some cases, the first network entity may receive signaling indicating a set of resource configurations from a second network entity. The first network entity may select a resource configuration (e.g., for communications with the UE) from the set based on a measured RSRP indicated by the UE or a location of the UE. The UE and the base station (e.g., the wireless device and the first network entity) may communicate according to the indicated or selected resource configurations.

27 Claims, 17 Drawing Sheets

(51) Int. Cl.
*H04W 72/51* (2023.01)
*H04W 72/541* (2023.01)

(56) References Cited

U.S. PATENT DOCUMENTS

| | | | |
|---|---|---|---|
| 2021/0044397 A1 | 2/2021 | Khoshnevisan et al. | |
| 2021/0051600 A1 | 2/2021 | Fakoorian et al. | |
| 2021/0051666 A1* | 2/2021 | Takeda | H04W 72/53 |
| 2022/0209929 A1* | 6/2022 | Visser | H04W 24/08 |
| 2022/0279532 A1* | 9/2022 | Barac | H04W 72/27 |
| 2022/0303108 A1* | 9/2022 | Faxér | H04L 5/1461 |
| 2023/0062577 A1* | 3/2023 | Rudolf | H04W 74/008 |

* cited by examiner

TECHNIQUES FOR RESOURCE CONFIGURATIONS BASED ON CHANNEL METRICS

FIELD OF DISCLOSURE

The present disclosure relates to wireless communications, including techniques for resource configurations based on channel metrics.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for resource configurations based on channel metrics. For example, the described techniques provide for a user equipment (UE) to use different resource configurations based on channel metrics. In some cases, a base station (or other network entity) may indicate a resource configuration for full-duplex communications dynamically based on channel metrics, which may improve a quality and a reliability of full-duplex communications between wireless devices (e.g., between UEs, base stations, or a combination thereof). That is, the base station may select resource configurations to mitigate interference between UEs in different cells. For example, the base station may indicate, to a UE, a time division duplex (TDD) configuration and a slot format indicator (SFI) for communications between the base station and the UE based on a location of the UE, a reference signal receive power (RSRP) associated with communications between the UE and the base station or the UE and a neighboring cell, or both. The UE may then communicate with the base station using the indicated TDD configuration, the indicated SFI, or both. In some examples, the base station may select the resource configurations from a set of resource configurations indicated by another network entity (e.g., another base station, a centralized unit (CU) associated with the base station). For example, the network entity may indicate a set of TDD configurations and a set of SFIs to the base station. The base station may select the TDD configuration and the SFI from the respective sets based on an RSRP indicated by the UE or the location of the UE. The base station may then communicate with the UE using the selected TDD configuration, the selected SFI, or both.

A method for wireless communication at a UE is described. The method may include transmitting, to a base station, signaling indicating a location of the UE and indicating a measured RSRP associated with communications from the base station, a wireless device, or both, receiving, from the base station and based on the transmitting, at least one of an indication of a TDD configuration and an SFI for communications between the base station and the UE, and communicating with the base station according to the TDD configuration, the SFI, or both.

An apparatus for wireless communication at a UE is described. The apparatus may include a processor, memory coupled with the processor, and instructions stored in the memory. The instructions may be executable by the processor to cause the apparatus to transmit, to a base station, signaling indicating a location of the UE and indicating a measured RSRP associated with communications from the base station, a wireless device, or both, receive, from the base station and based on the transmitting, at least one of an indication of a TDD configuration and an SFI for communications between the base station and the UE, and communicate with the base station according to the TDD configuration, the SFI, or both.

Another apparatus for wireless communication at a UE is described. The apparatus may include means for transmitting, to a base station, signaling indicating a location of the UE and indicating a measured RSRP associated with communications from the base station, a wireless device, or both, means for receiving, from the base station and based on the transmitting, at least one of an indication of a TDD configuration and an SFI for communications between the base station and the UE, and means for communicating with the base station according to the TDD configuration, the SFI, or both.

A non-transitory computer-readable medium storing code for wireless communication at a UE is described. The code may include instructions executable by a processor to transmit, to a base station, signaling indicating a location of the UE and indicating a measured RSRP associated with communications from the base station, a wireless device, or both, receive, from the base station and based on the transmitting, at least one of an indication of a TDD configuration and an SFI for communications between the base station and the UE, and communicate with the base station according to the TDD configuration, the SFI, or both.

Some examples of the method, apparatuses, and non-transitory computer-readable medium described herein may further include operations, features, means, or instructions for transmitting, to the base station, signaling indicating a cross link interference (CLI) associated with communications from the base station, the wireless device, or both, where receiving the at least one of the indication of the TDD configuration and the SFI may be based on transmitting the signaling indicating the CLI.

Some examples of the method, apparatuses, and non-transitory computer-readable medium described herein may further include operations, features, means, or instructions for receiving, from the base station, signaling indicating a first set of TDD configurations including at least the TDD configuration, a second set of SFIs including at least the SFI, or both and selecting, based on the location of the UE or the measured RSRP, the TDD configuration from the first set, the SFI from the second set, or both, where the communicating may be based on the selecting.

Some examples of the method, apparatuses, and non-transitory computer-readable medium described herein may further include operations, features, means, or instructions for receiving, from the base station, signaling indicating an updated TDD configuration from the first set, indicating an updated SFI from the second set, or both and communicating with the base station according to the updated TDD configuration, the updated SFI, or both.

Some examples of the method, apparatuses, and non-transitory computer-readable medium described herein may further include operations, features, means, or instructions for switching from communicating with the base station according to the TDD configuration, the SFI, or both to communicating with the base station according to the updated TDD configuration, the updated SFI, or both at a time indicated by a configured time period after receiving the signaling indicating the selected updated TDD configuration, the updated SFI, or both.

In some examples of the method, apparatuses, and non-transitory computer-readable medium described herein, receiving the signaling may include operations, features, means, or instructions for receiving, from the base station, the signaling via downlink control information (DCI) or via a medium access control-control element (MAC-CE).

In some examples of the method, apparatuses, and non-transitory computer-readable medium described herein, each TDD configuration within the first set of TDD configurations may be broadcast by the base station to the wireless device.

Some examples of the method, apparatuses, and non-transitory computer-readable medium described herein may further include operations, features, means, or instructions for signaling indicating a first set of RSRP thresholds each associated with a respective one of the first set of TDD configurations, one of the second set of SFIs, or both and indicating a second set of location thresholds each associated with a respective one of the first set of TDD configurations, one of the second set of SFIs, or both and identifying that the measured RSRP satisfies an RSRP threshold from the first set of RSRP thresholds that may be associated with the TDD configuration or the SFI or that the location of the UE satisfies a location threshold from the second set of SFIs that may be associated with the TDD configuration or the SFI, where the selecting may be based on the identifying.

Some examples of the method, apparatuses, and non-transitory computer-readable medium described herein may further include operations, features, means, or instructions for transmitting, to the base station, a report indicating that the measured RSRP satisfies the RSRP threshold or that the location of the UE satisfies the location threshold from the second set of SFIs, where the communicating may be based on transmitting the report.

Some examples of the method, apparatuses, and non-transitory computer-readable medium described herein may further include operations, features, means, or instructions for selecting, based on an updated location of the UE or an updated measured RSRP, an updated TDD configuration from the first set, an updated SFI from the second set, or both, transmitting, to the base station, signaling indicating the selected updated TDD configuration, the updated SFI, or both based on the selecting, and communicating with the base station according to the updated TDD configuration, the updated SFI, or both based on transmitting the signaling indicating the updated TDD configuration, the updated SFI, or both.

Some examples of the method, apparatuses, and non-transitory computer-readable medium described herein may further include operations, features, means, or instructions for switching from communicating with the base station according to the TDD configuration, the SFI, or both to communicating with the base station according to the updated TDD configuration, the updated SFI, or both at a time indicated by a configured time period after transmitting the signaling indicating the selected updated TDD configuration, the updated SFI, or both.

Some examples of the method, apparatuses, and non-transitory computer-readable medium described herein may further include operations, features, means, or instructions for transmitting, to the base station based on the communicating with the base station, signaling indicating an updated location of the UE or indicating an updated measured RSRP associated with communications from the base station, the wireless device, or both, receiving, from the base station, at least one of an indication of an updated TDD configuration and an updated SFI for communications between the base station and the UE based on the updated location or the updated measured RSRP, and communicating with the base station according to the updated TDD configuration, the updated SFI, or both.

In some examples of the method, apparatuses, and non-transitory computer-readable medium described herein, the base station corresponds to a serving cell of the UE and the wireless device corresponds to a neighboring cell of the UE.

In some examples of the method, apparatuses, and non-transitory computer-readable medium described herein, communicating with the base station may include operations, features, means, or instructions for communicating with the base station according to a full-duplex mode.

A method for wireless communication at a first network entity is described. The method may include receiving, from a second network entity, signaling indicating a first set of resource configurations, selecting, based on at least one of a measured RSRP indicated by a wireless device or a location of the wireless device, a resource configuration from the set for communications with the wireless device, and communicating with the wireless device according to the selected resource configuration.

An apparatus for wireless communication at a first network entity is described. The apparatus may include a processor, memory coupled with the processor, and instructions stored in the memory. The instructions may be executable by the processor to cause the apparatus to receive, from a second network entity, signaling indicating a first set of resource configurations, select, based on at least one of a measured RSRP indicated by a wireless device or a location of the wireless device, a resource configuration from the set for communications with the wireless device, and communicate with the wireless device according to the selected resource configuration.

Another apparatus for wireless communication at a first network entity is described. The apparatus may include means for receiving, from a second network entity, signaling indicating a first set of resource configurations, means for selecting, based on at least one of a measured RSRP indicated by a wireless device or a location of the wireless device, a resource configuration from the set for communications with the wireless device, and means for communicating with the wireless device according to the selected resource configuration.

A non-transitory computer-readable medium storing code for wireless communication at a first network entity is described. The code may include instructions executable by a processor to receive, from a second network entity, signaling indicating a first set of resource configurations, select, based on at least one of a measured RSRP indicated by a wireless device or a location of the wireless device, a resource configuration from the set for communications with the wireless device, and communicate with the wireless device according to the selected resource configuration.

Some examples of the method, apparatuses, and non-transitory computer-readable medium described herein may further include operations, features, means, or instructions for receiving, from the second network entity, signaling indicating a first set of RSRP thresholds each associated with a respective one of the set of resource configurations and indicating a second set of location thresholds each associated with a respective one of the set of resource configurations and comparing the measured RSRP to the first set of RSRP thresholds, the location of the wireless device to the second set of location thresholds, or both, where the selecting may be based on the comparing.

In some examples of the method, apparatuses, and non-transitory computer-readable medium described herein, each resource configuration within the set may be associated with the first network entity and the second network entity.

Some examples of the method, apparatuses, and non-transitory computer-readable medium described herein may further include operations, features, means, or instructions for receiving, from the second network entity, signaling indicating a set of thresholds each associated with a respective one of the set of resource configurations and comparing a channel metric corresponding to communications with the wireless device to the set of thresholds, where the selecting may be based on the comparing.

In some examples of the method, apparatuses, and non-transitory computer-readable medium described herein, the channel metric includes a CLI, an uplink transmission power, a downlink transmission power, or a combination thereof.

In some examples of the method, apparatuses, and non-transitory computer-readable medium described herein, the set of resource configurations includes at least one of a first set of TDD configurations, a second set of SFIs, and a third set of distributed unit (DU) resource configurations.

In some examples of the method, apparatuses, and non-transitory computer-readable medium described herein, the first network entity corresponds to a DU of an integrated access and backhaul node and the second network entity corresponds to a CU.

In some examples of the method, apparatuses, and non-transitory computer-readable medium described herein, communicating with the wireless device may include operations, features, means, or instructions for communicating with the wireless device according to a full-duplex mode.

A method for wireless communication at a base station is described. The method may include receiving, from a UE, signaling indicating a location of the UE and indicating a measured RSRP associated with communications from the base station, a wireless device, or both, transmitting, to the UE based on the receiving, at least one of an indication of a TDD configuration and an SFI for communications between the base station and the UE, and communicating with the UE according to the TDD configuration, the SFI, or both.

An apparatus for wireless communication at a base station is described. The apparatus may include a processor, memory coupled with the processor, and instructions stored in the memory. The instructions may be executable by the processor to cause the apparatus to receive, from a UE, signaling indicating a location of the UE and indicating a measured RSRP associated with communications from the base station, a wireless device, or both, transmit, to the UE based on the receiving, at least one of an indication of a TDD configuration and an SFI for communications between the base station and the UE, and communicate with the UE according to the TDD configuration, the SFI, or both.

Another apparatus for wireless communication at a base station is described. The apparatus may include means for receiving, from a UE, signaling indicating a location of the UE and indicating a measured RSRP associated with communications from the base station, a wireless device, or both, means for transmitting, to the UE based on the receiving, at least one of an indication of a TDD configuration and an SFI for communications between the base station and the UE, and means for communicating with the UE according to the TDD configuration, the SFI, or both.

A non-transitory computer-readable medium storing code for wireless communication at a base station is described. The code may include instructions executable by a processor to receive, from a UE, signaling indicating a location of the UE and indicating a measured RSRP associated with communications from the base station, a wireless device, or both, transmit, to the UE based on the receiving, at least one of an indication of a TDD configuration and an SFI for communications between the base station and the UE, and communicate with the UE according to the TDD configuration, the SFI, or both.

Some examples of the method, apparatuses, and non-transitory computer-readable medium described herein may further include operations, features, means, or instructions for receiving, from the UE, signaling indicating a CLI associated with communications from the base station, the wireless device, or both, where transmitting the at least one of the indication of the TDD configuration and the SFI may be based on receiving the signaling indicating the CLI.

Some examples of the method, apparatuses, and non-transitory computer-readable medium described herein may further include operations, features, means, or instructions for transmitting, to the UE, signaling indicating a first set of TDD configurations including at least the TDD configuration, a second set of SFIs including at least the SFI, or both, where communicating with the UE may be based on transmitting the signaling indicating the first set, the second set, or both.

Some examples of the method, apparatuses, and non-transitory computer-readable medium described herein may further include operations, features, means, or instructions for transmitting, to the UE, signaling indicating an updated TDD configuration from the first set, an updated SFI from the second set, or both and communicating with the UE according to the updated TDD configuration, the updated SFI, or both based on transmitting the signaling indicating the updated TDD configuration, the updated SFI, or both.

Some examples of the method, apparatuses, and non-transitory computer-readable medium described herein may further include operations, features, means, or instructions for transmitting signaling indicating a first set of RSRP thresholds each associated with a respective one of the first set of TDD configurations, one of the second set of SFIs, or both and indicating a second set of location thresholds each associated with a respective one of the first set of TDD configurations, one of the second set of SFIs, or both, where communicating with the UE may be based on transmitting the signaling indicating the first set of RSRP thresholds and indicating the second set of location thresholds.

Some examples of the method, apparatuses, and non-transitory computer-readable medium described herein may further include operations, features, means, or instructions for receiving, from the UE, signaling indicating an updated TDD configuration from the first set, an updated SFI from the second set, or both and communicating with the UE according to the updated TDD configuration, the updated SFI, or both based on receiving the signaling indicating the updated TDD configuration, the updated SFI, or both.

Some examples of the method, apparatuses, and non-transitory computer-readable medium described herein may further include operations, features, means, or instructions for receiving, from the UE based on the communicating with the UE, signaling indicating an updated location of the UE or indicating an updated measured RSRP associated with communications from the base station, the wireless device, or both, transmitting, to the UE, at least one of an indication of an updated TDD configuration and an updated SFI for communications between the base station and the UE based on the updated location or the updated measured RSRP, and communicating with the UE according to the updated TDD configuration, the updated SFI, or both.

DETAILED DESCRIPTION

Figure 1:
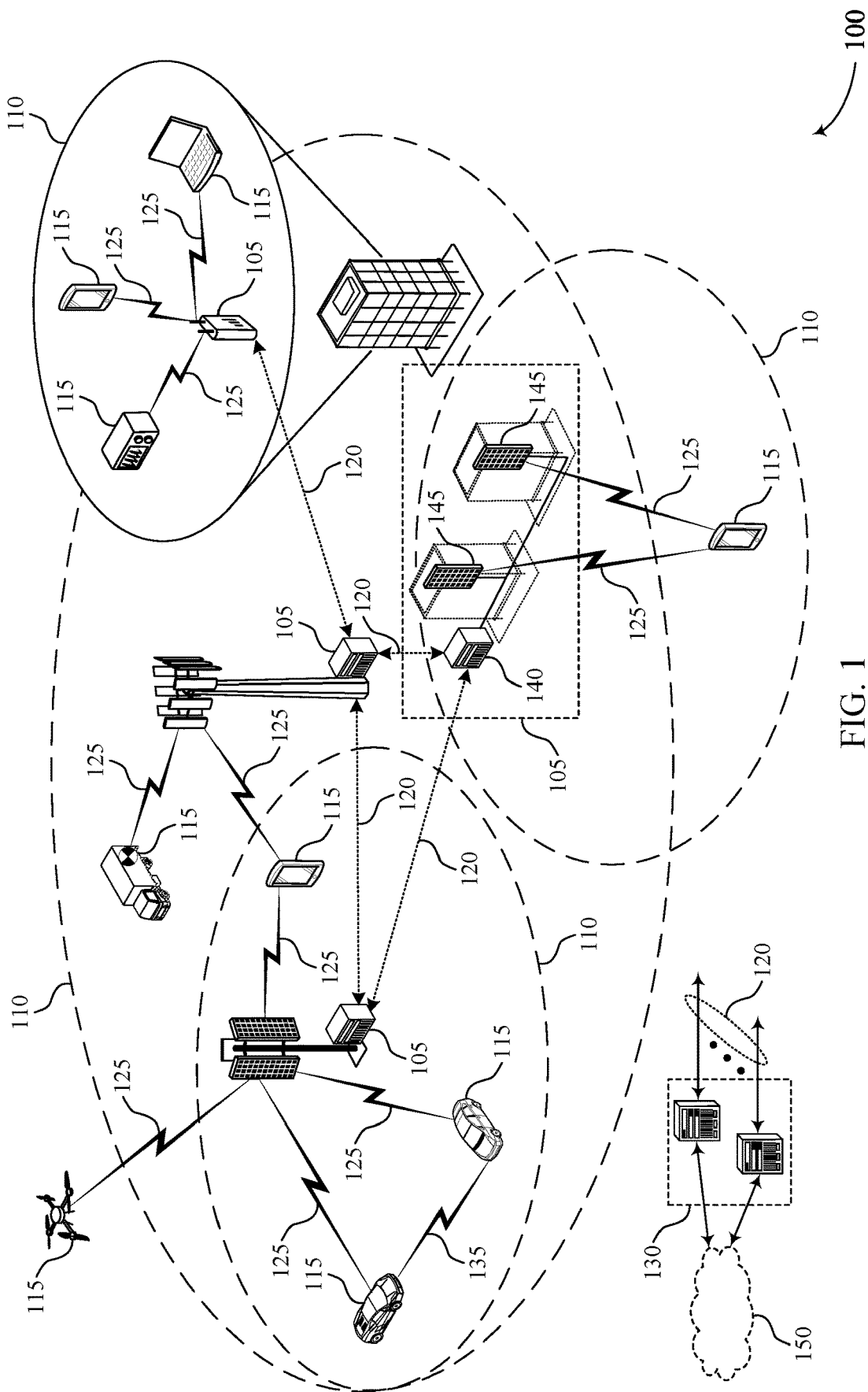
FIG. 1 illustrates an example of a wireless communications system that supports techniques for resource configurations based on channel metrics in accordance with various aspects of the present disclosure.

In some wireless communications systems, a user equipment (UE) capable of operating using full-duplex communications may be supported by a base station for some threshold pathloss or distance values. That is, the UE may communicate with the base station while the pathloss or distance values associated with the UE are less than a threshold pathloss value or a threshold distance value. Thus, full-duplex communications between the UE and the base station may depend on the relative location of the UE or an RSRP associated with communications between the UE and the base station or between the UE and a neighboring cell. For example, UEs that are closer to an edge of a cell may experience higher interference from UEs in a neighboring cell or may cause higher interference to the UEs in the neighboring cell. In some cases, it may be desirable to improve a reliability or quality of full-duplex communications between a UE and base station to enable the UE and base station to operate using full-duplex communications (e.g., to decrease a likelihood that pathloss or distance values associated with the UE are above the threshold pathloss value or the threshold distance value).

Techniques described herein relate to a network entity (e.g., a base station, a distributed unit (DU) associated with a base station, a centralized unit (CU) associated with a base station) to dynamically configure resources for full-duplex communications with a wireless device (e.g., a UE) based on channel metrics. In some cases, the network entity may indicate resource configurations for full-duplex communications dynamically based on channel metrics, which may improve a quality and a reliability of full-duplex communications between wireless devices (e.g., base stations, UEs). For example, to mitigate interference between UEs in different cells, a network entity may indicate a time division duplex (TDD) configuration and a slot format indicator (SFI) to a UE for communications between the network entity and the UE based on a location of the UE, based on a reference signal receive power (RSRP) associated with communications between the UE and the network entity, based on an RSRP associated with communications between the UE and a neighboring cell, or a combination thereof. The UE may communicate with the network entity using the indicated TDD configuration, the indicated SFI, or both. In some cases, performing full-duplex communications using resource configurations selected based on channel metrics (or based on locations of the UE) may result in higher reliability communications when compared to performing full-duplex communications using resource configurations that are not selected based on channel metrics.

In some examples, the network entity may select the resource configurations from a set of resource configurations indicated by another network entity (e.g., another base station, a CU associated with the first network entity). For example, the other network entity may indicate a set of TDD configurations and a set of SFIs to the first network entity. The first network entity may select the TDD configuration and the SFI from the respective sets based on an RSRP indicated by the UE or the location of the UE.

Some aspects of the subject matter described herein may be implemented to realize one or more advantages. The described techniques may support improvements in full-duplex communications by enabling a wireless device to use dynamic resource configurations based on channel metrics, which may improve the quality and reliability of communications. As such, supported techniques may include improved network operations, and, in some examples, may promote network efficiencies, among other benefits.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to techniques for resource configurations based on channel metrics.

FIG. 1 illustrates an example of a wireless communications system 100 that supports techniques for resource configurations based on channel metrics in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with some bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of some radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over some carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientation with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with some orientation (e.g., with respect to the antenna array of the transmitting device or receiving device, or with respect to some other orientation).

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In wireless communications system 100, one or more wireless devices (e.g., UEs 115, base stations 105, IAB nodes) may be capable of supporting full-duplex communications (e.g., may be capable of transmitting and receiving transmission simultaneously). For example, a UE 115 may communicate with a base station 105 using full-duplex operations, where the base station 105 and the UE 115 communicate uplink transmissions and downlink transmissions simultaneously. In some cases, full-duplex communications between the UE 115 and the base station 105 (e.g., with desired performance) may not be supported in cases that a pathloss or distance value (e.g., between the UE 115 and the base station 105) exceeds threshold pathloss or distance values. That is, wireless device may have a target signal-to-interference ratio (SIR) for full-duplex communications. Here, the wireless device may determine threshold pathloss or distance values associated with the target SIR for full-duplex communications, where pathloss or distance values that exceed the determined threshold values may result in communications that fail to meet the target SIR. For example, a UE 115 communicating according to a full-duplex mode may have a target downlink SIR (e.g., signal-to-self-interference ratio) of 20 decibels (dB). Here, the UE 115 may determine that a threshold downlink pathloss and non-line-of-sight (NLOS) distance is in a range of 102 dB and 40 meters (m), respectively, or less. In another example, a base station 105 communicating according to a full-duplex mode may have a target uplink SIR of 20 dB. Here, the base station 105 may determine that a threshold uplink pathloss and NLOS distance is in a range of 98 dB and 20 m, respectively, or less.

In some cases, threshold pathloss or distance values may depend on an isolation plus cancelation implemented by the wireless device (e.g., which may be associated with locations and beam facing directionality between two antenna panels of the wireless device). In some cases, adding more isolation plus cancelation may enable the wireless device to achieve a higher SIR at longer distances or higher pathloss values. As such, full-duplex operations (e.g., and related configurations) may depend on the relative location of a wireless device (e.g., with respect to a transmitting device), an RSRP of the wireless device, a pathloss to a cell, or a combination thereof. Additionally, wireless devices that are be closer to a cell edge (e.g., closer to a boundary of the coverage area 110) may experience higher interference from wireless devices communicating in a neighboring cell (e.g., communicating with another base station 105 associated with a different coverage area 110), or may cause higher interference to the wireless devices communicating in the neighboring cell.

To mitigate such interference (e.g., inter-cell interference, cross link interference (CLI)) between the wireless devices such as UEs 115, a network entity (e.g., a base station 105, a CU associated with the base station 105, a DU associated with the base station 105) may dynamically select resource configurations for communications with a wireless device (e.g., a UE 115). For example, the base station 105 may align resources (e.g., symbols) used for reception and transmission (e.g., TDD patterns) or the base station 105 may partition resources in the time-domain or the frequency-domain among different cells. For example, the base station 105 may align the resources such that when a first UE 115 transmits uplink signals, a second UE 115 refrains from receiving downlink signals. In another example, the base station 105 may partition the resources such that in even-numbered resources, some UEs 115 are configured to perform communications in the uplink or downlink, and in odd-numbered resources, other UEs 115 are configured to perform communications in the uplink or downlink.

In the example of wireless communications system 100, network entities (e.g., base stations 105), may dynamically configure resources for full-duplex communications with a wireless device (e.g., a UE 115) based on channel metrics. In some cases, the network entity may indicate resource configurations for full-duplex communications dynamically based on channel metrics, which may improve a quality and a reliability of full-duplex communications between wireless devices (e.g., base stations, UEs). For example, to mitigate interference between UEs in different cells, a network entity may indicate a TDD configuration and an SFI to a UE 115 for communications between the network entity and the UE 115 based on a location of the UE 115, based on an RSRP associated with communications between the UE 115 and the network entity, based on an RSRP associated with communications between the UE 115 and a neighboring cell, or a combination thereof. The UE 115 may communicate with the network entity using the indicated TDD configuration, the indicated SFI, or both. In some cases, performing full-duplex communications using resource configurations selected based on channel metrics (or based on locations of the UE 115) may result in higher reliability communications when compared to performing full-duplex communications using resource configurations that are not selected based on channel metrics.

Figure 2:
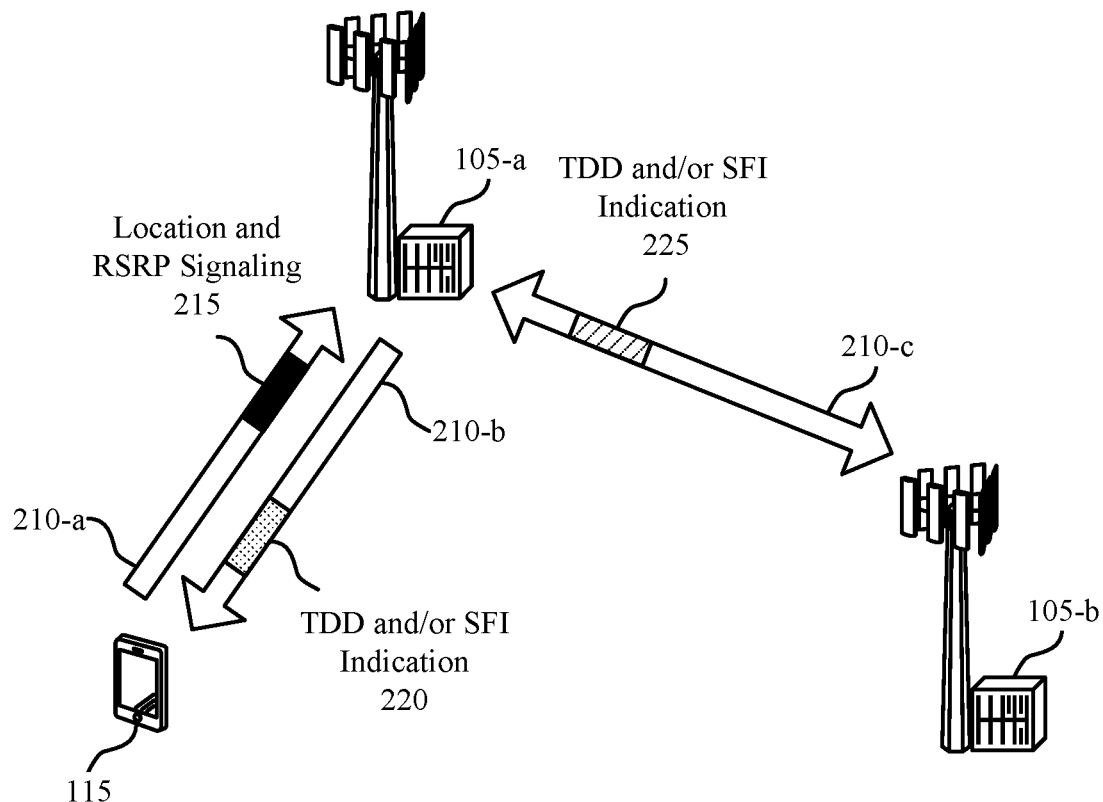
FIG. 2 illustrates an example of a wireless communications system that supports techniques for resource configurations based on channel metrics in accordance with various aspects of the present disclosure.

FIG. 2 illustrates an example of a wireless communications system 200 that supports techniques for resource configurations based on channel metrics in accordance with various aspects of the present disclosure. In some examples, the wireless communications system 200 may implement aspects of the wireless communications system 100 or may be implemented by aspects of the wireless communications system 100 as described with reference to FIG. 1. For example, the wireless communications system 200 may include a UE 115, a base station 105-a, and a base station 105-b, which may be examples of corresponding devices described herein with reference to FIG. 1. The wireless communications system 200 may include features for improved communications between the UE 115 and the base stations 105, among other benefits.

The UE 115 may communicate with the base station 105-a via the communications links 210. For example, the UE 115 may transmit uplink signaling to the base station 105-a via a communications link 210-a and the UE 115 may receive downlink signaling from the base station 105-a via a communications link 210-b. In some cases, the UE 115 may be supported by a serving cell. Additionally or alternatively, the base station 105-a may communicate with a wireless device (e.g., the base station 105-b) via a communications link 210-c. In some cases, the UE 115 and the base station 105-a may use a resource configuration (e.g., an RSRP-based resource configuration) for communications, where the resource configuration may include a TDD configuration, a downlink and uplink resource configuration, a slot format configuration, or an IAB-specific resource configuration. The resource configuration may have some relationship to a measured property of the communications between the UE 115 and the base station 105-a. For example, a TDD configuration or an SFI may be RSRP-based.

In some examples, the base station 105-a may determine a TDD configuration (e.g., TDDConfigDedicated), an SFI, or both for the UE 115 based on one or more measured properties, which may include measured or reported channel metrics (e.g., RSRP) of the serving cells or neighboring cells, a CLI from or to neighboring cells or UEs 115, or a combination thereof. The measured properties may be reported to the base station 105-a from the UE 115 in a serving cell, a UE 115 in a neighboring cell, or a combination thereof. In some examples, the UE 115 may transmit, to the base station 105-a, location and RSRP signaling 215 which may indicate the location of the UE 115 (e.g., with respect to the base station 105-a) and a measured RSRP associated with communications from the base station 105-a, the base station 105-b, or both. In response to the location and RSRP signaling 215, the base station 105-a may transmit an indication 220 of a TDD configuration, an SFI, or both for communications between the base station 105-a and the UE 115. In some cases, the base station 105-a may change or update the TDD configuration, the SFI, or both in response to changes in the channel conditions (e.g., the RSRP), the location of the UE 115, or both. For example, a UE 115 may be a mobile device which may move between cells, causing the base station 105-a to change the TDD configuration, the SFI, or both to improve user experience.

In some cases, the base station 105-a may provide the UE 115 with multiple TDD configurations (e.g., multiple TDDConfigDedicated), multiple SFIs, or a combination thereof via the TDD and. The different TDD configurations and SFIs may be associated with different measured RSRP values or RSRP thresholds, and the UE 115 may select a TDD configuration, an SFI, or both out of the multiple TDD configurations and multiple SFIs provided based on an explicit indication (e.g., from the base station 105-a) or based on some measurement. In some examples, the UE 115 may autonomously change its active configuration (e.g., the configuration the UE 115 may select for communications with the base station 105-a) based on measurements (e.g., an RSRP). The base station 105-a may provide conditions (e.g., thresholds) for the UE 115 to choosing and activating each configuration. For example, the base station 105-a may provide the UE 115 with an RSRP threshold and four different TDD configurations. The UE 115 may measure an RSRP, and if the RSRP exceeds the threshold provided by the base station 105-a, the UE 115 may select a TDD configuration of the four TDD configurations that may be based on the RSRP that satisfies the RSRP threshold. In some examples, such measurements may be configured for the UE 115 to select a TDD configuration. For example, a reference signal may be configured for the UE 115 to use for RSRP measurements or pathloss estimation (e.g., a synchronization signal block (SSB), a CSI-RS).

In some examples, the UE 115 may be configured to transmit the location and RSRP signaling 215 to the base station 105-a when triggered by an event or when a measured metric may satisfy some threshold. For example, the UE 115 may transmit the location and RSRP signaling 215 in cases that the measured RSRP associated with communications from the base station 105-a falls below a threshold. In another example, the UE 115 may transmit the location and RSRP signaling 215 in cases that the measured RSRP associated with communications from the base station 105-b exceeds a threshold. Additionally or alternatively, the UE 115 may indicate to the base station 105-a that the UE 115 may be changing its active configuration. For example, the UE 115 may instead transmit signaling indicating that the UE 115 may be switching from using one TDD configuration to using a different TDD configuration. In some cases, the timeline of changing the TDD configurations, SFIs, or both may be configured and indicated by the UE 115. For example, the UE 115 may notify the base station 105-a that the UE 115 may switch from one TDD configuration, SFI, or both to a different TDD configuration, SFI, or both. The UE 115 may not switch immediately, and as such the UE 115 may also indicate to the base station 105-a a quantity of slots (e.g., N1 slots) after transmitting the notification that the UE 115 may perform the switch to the different TDD configuration, SFI, or both. As such, the UE 115 may enable the base station 105-a enough time to process the notification and communicate with the UE 115 according to the different TDD configuration, the different SFI, or both (e.g., at the indicated time after the UE 115 transmits the notification to the base station 105-a).

In some cases, the base station 105-a may transmit signaling to the UE 115 indicating for the UE 115 to change the active configuration via downlink control information (DCI) or a MAC control element (MAC-CE). The base station 105-a may already be receiving measurement reports from the UE 115 and other network entities (e.g., a CU or a DU) for other purposes, and based on the different measurement reports the base station 105-a may determine that the UE 115 may switch its TDD configuration, SFI, or both. In some cases, the base station 105-a may transmit signaling (e.g., RRC signaling) to the UE 115 to change the TDD configuration or the SFI at any time, which may enable for lower signaling overhead and faster reconfiguration between the base station 105-a and the UE-115. For example, the UE 115 may reconfigure the TDD configuration, the SFI, or both in a shorter time period after receiving the indication to switch from the base station 105-a (e.g., N2 slots after receiving the notification).

In some examples, the base station 105-a may broadcast multiple common TDD configurations (e.g., TDDConfigCommon) to all of the UEs 115 in a cell (e.g., cell-specific TDD configurations). The base station 105-a may broadcast the common TDD configurations via a system information block (SIB) (e.g., a SIB-1) or via remaining minimum system information (RMSI). In some cases, the base station 105-a may indicate the multiple common TDD configurations to the UEs 115 in the SIB, and the UEs 115 (e.g., the UE 115) may select a common TDD configuration of the multiple common TDD configurations based on one or multiple indicated RSRP thresholds.

In some cases, the techniques described herein may support signaling TDD configurations and SFIs and the selection conditions of the UE 115 (e.g., an RSRP threshold) between DUs and CUs or across CUs. For example, the base station 105-a may be a first network entity, and the base station 105-b may be a second network entity, and the UE 115 may be a wireless device (e.g., a UE 115 or a base station 105). The base station 105-a may correspond to a DU or may be an IAB node, and the base station 105-b may correspond to a CU. The base station 105-a and the base station 105-b may use F1-application (AP) signaling to indicate the multiple resource configurations (e.g., TDD configurations, SFIs, DU resource configurations) and the selection conditions for the resource configurations. The F1-AP signaling may originate at the base station 105-a or the base station 105-b. In some cases, the base station 105-a and the base station 105-b may use an Xn interface and Xn signaling for the exchange of information and coordination across the base stations 105 (e.g., across CUs).

In some examples, an intended TDD configuration message (e.g., a message supported over the F1-AP interface and the Xn interface) may coordinate CLI management across neighboring cells. For example, a first cell may be provided with the intended TDD configuration message indicating a TDD configuration for a second cell. If there are multiple intended TDD configurations for a given cell, where each of the intended TDD configurations may be associated with different RSRP thresholds or locations of the UE 115, the base station 105-*a* or the base station 105-*a* may configure multiple common intended TDD configurations, and the UE 115 may select an intended TDD configuration based on one or more indicated RSRP thresholds. For example, the base station 105-*a* may receive an indication 225 of a set of TDD configurations, a set of SFIs, or both from the base station 105-*b*. The base station 105-*a* may then select a TDD configuration from the set of TDD configurations, an SFI from the set of SFIs, or both for communications with the UE 115 based on a measured RSRP indicated by the UE 115 or a location of the UE 115.

In an IAB system (e.g., between the first network entity and the second network entity), a CU (e.g., the base station 105-*b*) may provide one or multiple DUs (e.g., the base station 105-*a*) with a resource configuration for each DU cell. For example, the resource configuration may indicate whether the DU is hard, soft, or not available (HSNA), where a hard node may use provided resources, a soft node may use the provided resources as long as some condition may be met, and a not available node may refrain from using the provided resources. The resource configuration may also indicate a TDD pattern (e.g., a TDD configuration), which may be RSRP-based. In some examples, the signaled resource configuration may be extended to the frequency-domain, the spatial domain, or both, and the signaling may be extended to non-IAB DUs.

The base station 105-*b* (e.g., a CU) may provide the base station 105-*a* (e.g., a DU) with multiple DU resource configurations (e.g., including an HSNA indication, a TDD configuration, or a combination thereof), and the base station 105-*b* may provide the base station 105-*a* with conditions under which to use one or multiple of the DU resource configurations. For example, the base station 105-*a* may use a DU resource configuration for child nodes with measured RSRPs (e.g., or measured CLI or other interference) that may satisfy some threshold. The selected resource configuration by the base station 105-*a* may be location dependent (e.g., if the information is available to the base station 105-*a*). Additionally or alternatively, the configuration selection condition may depend on a maximum uplink transmission power of a child node, a maximum downlink transmission power of the base station 105-*a* (e.g., the DU cell), or both. For example, a larger transmission power may result in greater interference, which may impact which resource configuration the base station 105-*a* may select.

In examples that the base station 105-*b* (or CU associated with the base station 105-*a*) transmits the indication of sets of possible TDD configurations, sets of SFIs, or both to the base station 105-*a* via the indication 225, the base station 105-*a* may select a TDD configuration from the set of TDD configurations (e.g., indicated to the base station 105-*a* by the base station 105-*b* via the indication 225), select an SFI from the set of SFIs (e.g., indicated to the base station 105-*a* by the base station 105-*b* via the indication 225), or both. Then, the base station 105-*a* may indicate the selected TDD configuration, the selected SFI, or both, to the UE 115 via the indication 220.

Figure 3:
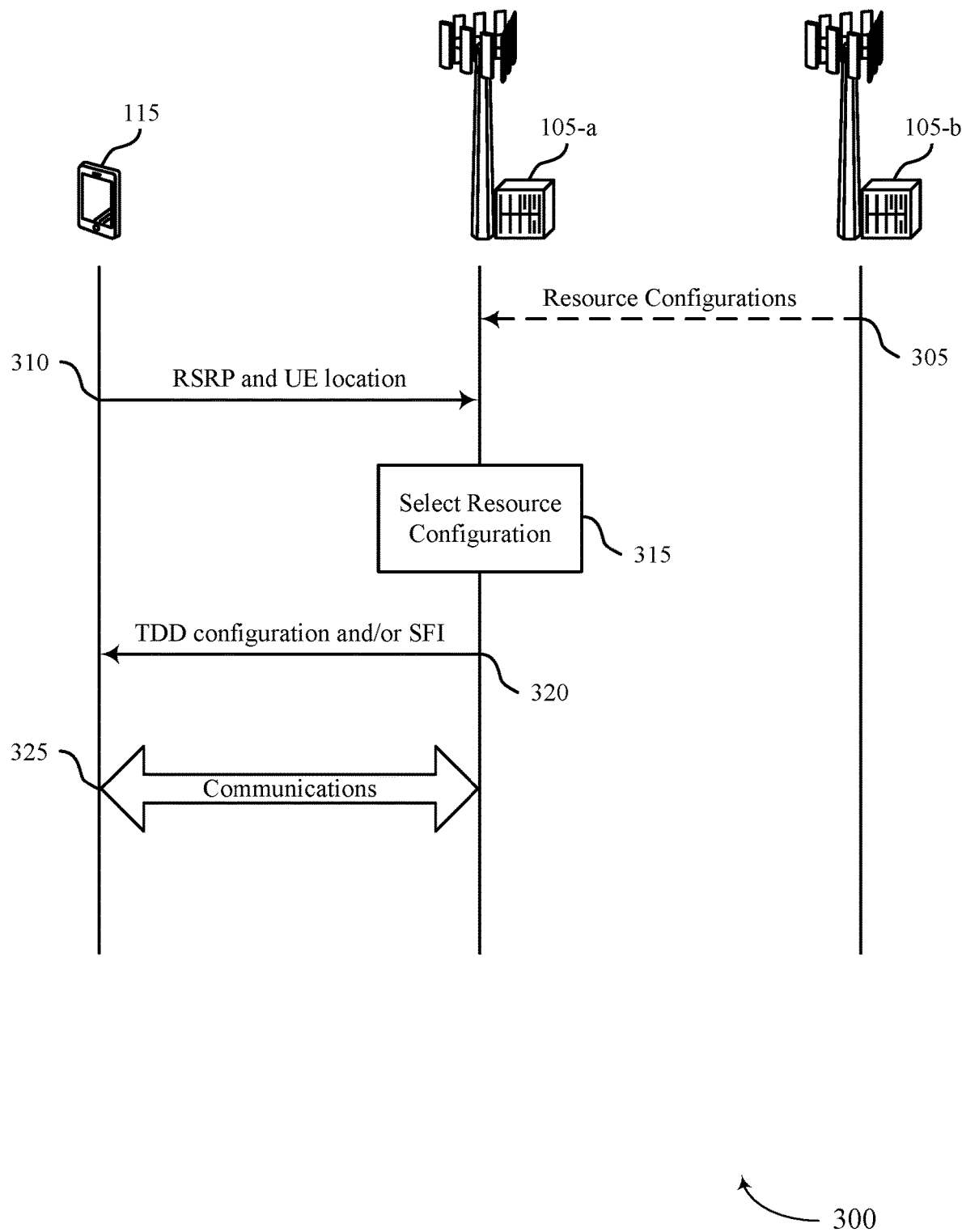
FIG. 3 illustrates an example of a process flow that supports techniques for resource configurations based on channel metrics in accordance with various aspects of the present disclosure.

FIG. 3 illustrates an example of a process flow 300 that supports techniques for resource configurations based on channel metrics in accordance with various aspects of the present disclosure. The process flow 300 may implement aspects of wireless communications systems 100 and 200, or may be implemented by aspects of the wireless communications system 100 and 200. For example, the process flow 300 may illustrate operations between a UE 115, a base station 105-*a*, and a base station 105-*b*, which may be examples of corresponding devices described with reference to FIGS. 1 and 2. In the following description of the process flow 300, the operations between the UE 115, the base station 105-*a*, and the base station 105-*b* may be transmitted in a different order than the example order shown, or the operations performed by the UE 115, the base station 105-*a*, and the base station 105-*b* may be performed in different orders or at different times. Some operations may also be omitted from the process flow 300, and other operations may be added to the process flow 300.

In some cases, the base station 105-*a* may be a serving base station 105-*a* for the UE 115 and the base station 105-*b* may be associated with a neighboring cell. In some other cases, the base station 105-*a* and the base station 105-*b* may be associated with a single base station 105. Here, the base station 105-*a* may correspond to a network entity such as a DU and the base station 105-*b* may correspond to another network entity such as a CU. Additionally, the UE 115 may be an example of any wireless device.

At 305, the base station 105-*a* may receive, from the base station 105-*b*, signaling indicating a set of resource configurations. The set of resource configurations may include a ser of TDD configurations, a set of SFIs, a set of DU resource configurations, and the like. In some cases, each resource configuration within the set may be associated with the base station 105-*a* and the second base station 105-*b*. Additionally, the base station 105-*a* may receive, from the base station 105-*b* (e.g., or another network entity such as a CU) signaling indicating a first set of RSRP thresholds each associated with a respective one of the set of resource configurations and indicating a second set of location thresholds each associated with a respective one of the set of resource configurations. Additionally, the base station 105-*a* may receive, from the base station 105-*b*, signaling indicating a set of thresholds (e.g., corresponding to a CLI, an uplink transmission power, a downlink transmission power) each associated with a respective one of the set of resource configurations.

At 310, the UE 115 may transmit, to the base station 105-*a*, signaling indicating a location of the UE 115 (e.g., with respect to the base station 105-*a*) and indicating a measured RSRP associated with communications from the base station 105-*a*, a wireless device (e.g., the base station 105-*b* or a UE 115 in a neighboring cell), or both. In some cases, the UE 115 may also indicate a CLI associated with communications from the base station 105-*a*, the base station 105-*b* (e.g., or a UE 115 in a neighboring cell), or both.

At 315, the base station 105-*a* may select a resource configuration from the set of resource configurations for communications with the UE 115 (e.g., or a different wireless device, such as a base station 105) based on at least one of a measured RSRP indicated by the UE 115 or a location of the UE 115. For example, the base station 105-*a* may compare the measured RSRP to the first set of RSRP thresholds, the location of the UE 115 to the second set of location thresholds, or both, where the selecting is based at least in part on the comparing. In another example, the base station 105-a may compare a channel metric (e.g., a CLI, an uplink transmission power, a downlink transmission power) corresponding to communications with the UE 115 to the set of thresholds, where the selecting is based on the comparing.

At 320, the UE 115 may receive, from the base station 105-a and based on transmitting the signaling (e.g., via a MAC-CE, via a DCI), at least one of an indication of a TDD configuration and an SFI for communications between the base station 105-a and the UE 115. In some cases, the base station 105-a may change or update the TDD configuration, the SFI, or both based on changes to the RSRP measured by the UE 115 or the location of the UE 115. In some cases, the UE 115 may receive, from the base station 105-a, signaling indicating a first set of TDD configurations comprising at least the TDD configuration, a second set of SFIs including at least the SFI, or both. Here, the UE 115 may select, based on the location of the UE or the measured RSRP, the TDD configuration from the first set, the SFI from the second set, or both.

At 325, the base station 105-a may communicate with the UE 115 according to the selected resource configuration, such as a TDD configuration, an SFI, or both. That is, at 325 the base station 105-a and UE 115 may communicate according to a full-duplex mode where the base station 105-a and the UE 115 may each simultaneously transmit and receive transmissions.

Figure 4:
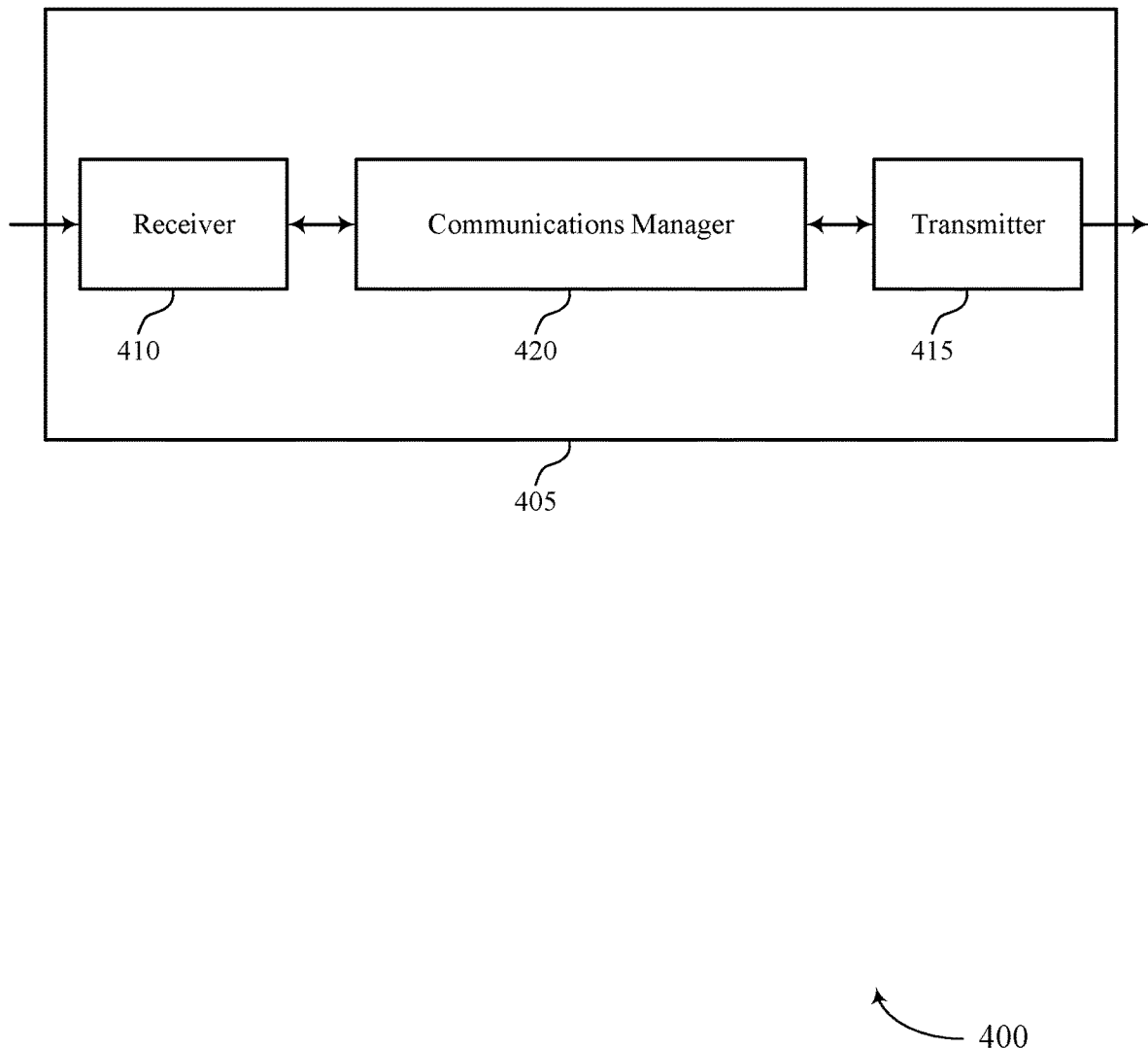
FIGS. 4 and 5 show block diagrams of devices that support techniques for resource configurations based on channel metrics in accordance with various aspects of the present disclosure.

FIG. 4 shows a block diagram 400 of a device 405 that supports techniques for resource configurations based on channel metrics in accordance with various aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for resource configurations based on channel metrics). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for resource configurations based on channel metrics). In some examples, the transmitter 415 may be co-located with a receiver 410 in a transceiver component. The transmitter 415 may utilize a single antenna or a set of multiple antennas.

The communications manager 420, the receiver 410, the transmitter 415, or various combinations thereof or various components thereof may be examples of means for performing various aspects of techniques for resource configurations based on channel metrics as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for transmitting, to a base station, signaling indicating a location of the UE and indicating a measured RSRP associated with communications from the base station, a wireless device, or both. The communications manager 420 may be configured as or otherwise support a means for receiving, from the base station and based on the transmitting, at least one of an indication of a TDD configuration and an SFI for communications between the base station and the UE. The communications manager 420 may be configured as or otherwise support a means for communicating with the base station according to the TDD configuration, the SFI, or both.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for resource configurations based on channel metrics, which may improve the quality and reliability of communications for the device 405. The supported techniques may include improve network operations, and, in some examples, may promote network efficiencies among other benefits.

Figure 5:
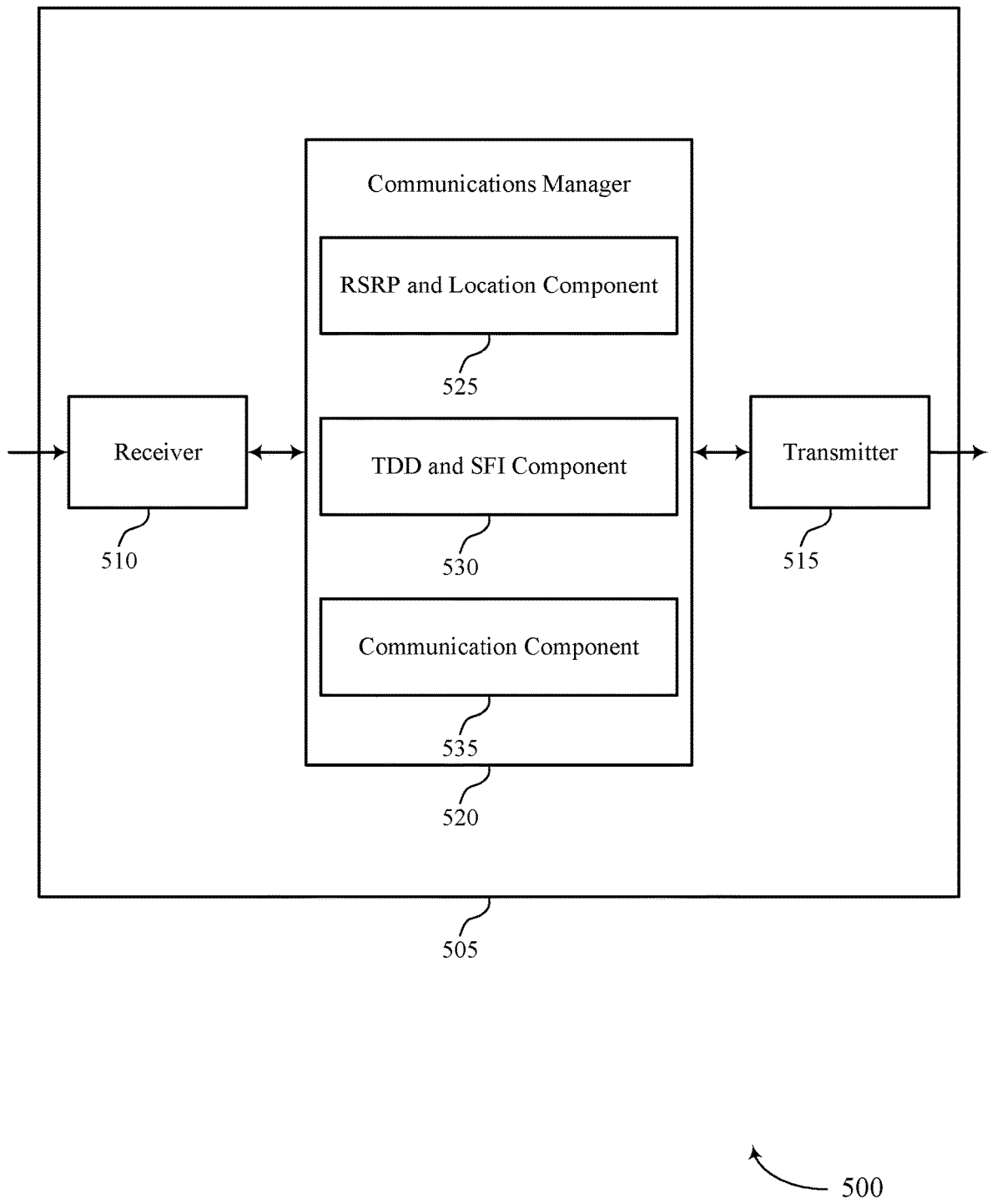

FIG. 5 shows a block diagram 500 of a device 505 that supports techniques for resource configurations based on channel metrics in accordance with various aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for resource configurations based on channel metrics). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for resource configurations based on channel metrics). In some examples, the transmitter 515 may be co-located with a receiver 510 in a transceiver component. The transmitter 515 may utilize a single antenna or a set of multiple antennas.

The device 505, or various components thereof, may be an example of means for performing various aspects of techniques for resource configurations based on channel metrics as described herein. For example, the communications manager 520 may include an RSRP and location component 525, a TDD and SFI component 530, a communication component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The RSRP and location component 525 may be configured as or otherwise support a means for transmitting, to a base station, signaling indicating a location of the UE and indicating a measured RSRP associated with communications from the base station, a wireless device, or both. The TDD and SFI component 530 may be configured as or otherwise support a means for receiving, from the base station and based on the transmitting, at least one of an indication of a TDD configuration and an SFI for communications between the base station and the UE. The communication component 535 may be configured as or otherwise support a means for communicating with the base station according to the TDD configuration, the SFI, or both.

Figure 6:
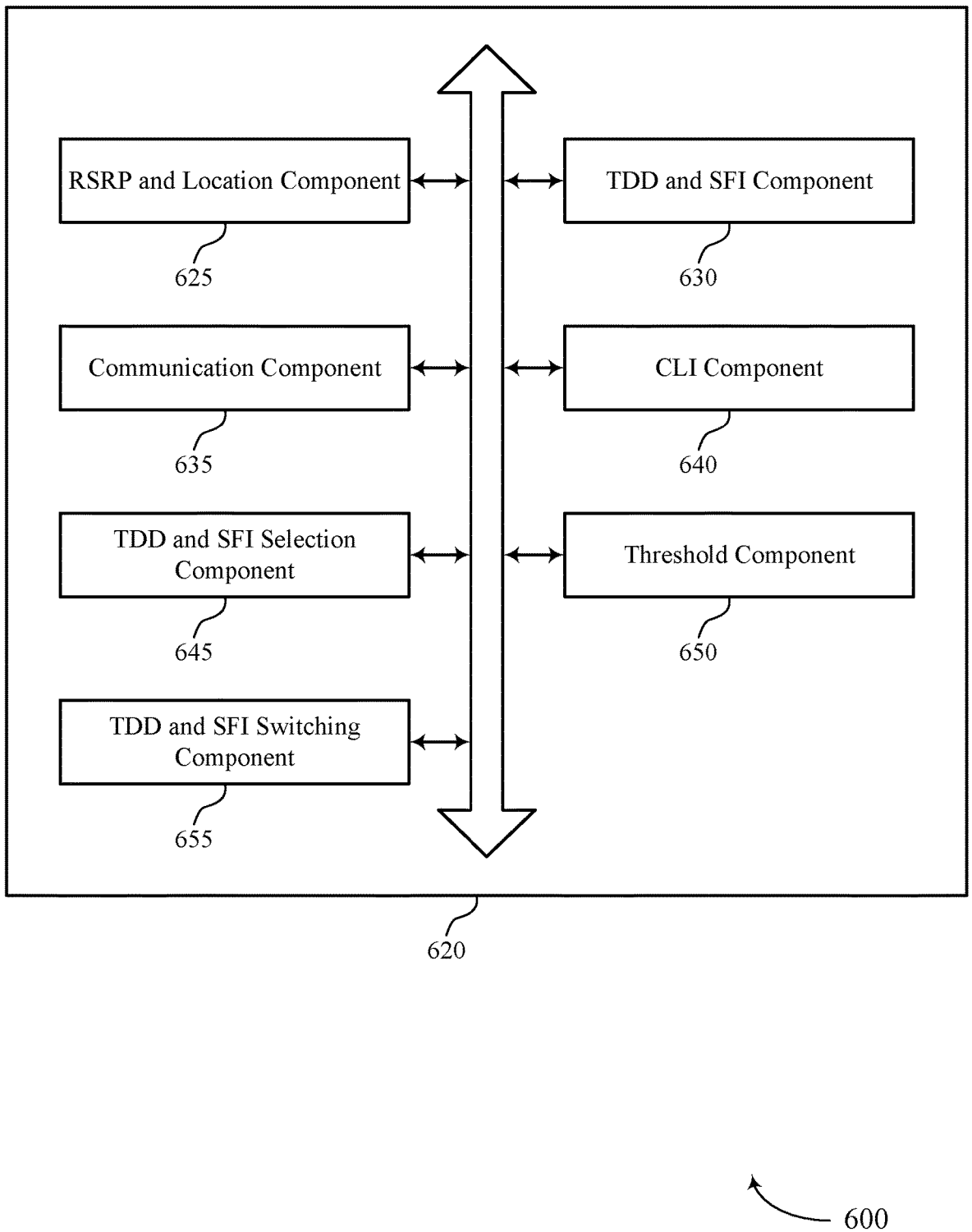
FIG. 6 shows a block diagram of a communications manager that supports techniques for resource configurations based on channel metrics in accordance with various aspects of the present disclosure.

FIG. 6 shows a block diagram 600 of a communications manager 620 that supports techniques for resource configurations based on channel metrics in accordance with various aspects of the present disclosure. The communications manager 620 may be an example of aspects of a communications manager 420, a communications manager 520, or both, as described herein. The communications manager 620, or various components thereof, may be an example of means for performing various aspects of techniques for resource configurations based on channel metrics as described herein. For example, the communications manager 620 may include an RSRP and location component 625, a TDD and SFI component 630, a communication component 635, a CLI component 640, a TDD and SFI selection component 645, a threshold component 650, a TDD and SFI switching component 655, or any combination thereof. Each of these components may communicate, directly or indirectly, with one another (e.g., via one or more buses).

The communications manager 620 may support wireless communication at a UE in accordance with examples as disclosed herein. The RSRP and location component 625 may be configured as or otherwise support a means for transmitting, to a base station, signaling indicating a location of the UE and indicating a measured RSRP associated with communications from the base station, a wireless device, or both. The TDD and SFI component 630 may be configured as or otherwise support a means for receiving, from the base station and based on the transmitting, at least one of an indication of a TDD configuration and an SFI for communications between the base station and the UE. The communication component 635 may be configured as or otherwise support a means for communicating with the base station according to the TDD configuration, the SFI, or both.

In some examples, the CLI component 640 may be configured as or otherwise support a means for transmitting, to the base station, signaling indicating a CLI associated with communications from the base station, the wireless device, or both, where receiving the at least one of the indication of the TDD configuration and the SFI is based on transmitting the signaling indicating the CLI.

In some examples, the TDD and SFI component 630 may be configured as or otherwise support a means for receiving, from the base station, signaling indicating a first set of TDD configurations including at least the TDD configuration, a second set of SFIs including at least the SFI, or both. In some examples, the TDD and SFI selection component 645 may be configured as or otherwise support a means for selecting, based on the location of the UE or the measured RSRP, the TDD configuration from the first set, the SFI from the second set, or both, where the communicating is based on the selecting.

In some examples, the TDD and SFI component 630 may be configured as or otherwise support a means for receiving, from the base station, signaling indicating an updated TDD configuration from the first set, indicating an updated SFI from the second set, or both. In some examples, the communication component 635 may be configured as or otherwise support a means for communicating with the base station according to the updated TDD configuration, the updated SFI, or both.

In some examples, the TDD and SFI switching component 655 may be configured as or otherwise support a means for switching from communicating with the base station according to the TDD configuration, the SFI, or both to communicating with the base station according to the updated TDD configuration, the updated SFI, or both at a time indicated by a configured time period after receiving the signaling indicating the selected updated TDD configuration, the updated SFI, or both.

In some examples, to support receiving the signaling, the TDD and SFI component 630 may be configured as or otherwise support a means for receiving, from the base station, the signaling via DCI or via a MAC-CE. In some examples, each TDD configuration within the first set of TDD configurations is broadcast by the base station to the wireless device.

In some examples, the threshold component 650 may be configured as or otherwise support a means for signaling indicating a first set of RSRP thresholds each associated with a respective one of the first set of TDD configurations, one of the second set of SFIs, or both and indicating a second set of location thresholds each associated with a respective one of the first set of TDD configurations, one of the second set of SFIs, or both. In some examples, the threshold component 650 may be configured as or otherwise support a means for identifying that the measured RSRP satisfies an RSRP threshold from the first set of RSRP thresholds that is associated with the TDD configuration or the SFI or that the location of the UE satisfies a location threshold from the second set of SFIs that is associated with the TDD configuration or the SFI, where the selecting is based on the identifying.

In some examples, the threshold component 650 may be configured as or otherwise support a means for transmitting, to the base station, a report indicating that the measured RSRP satisfies the RSRP threshold or that the location of the UE satisfies the location threshold from the second set of SFIs, where the communicating is based on transmitting the report.

In some examples, the TDD and SFI selection component 645 may be configured as or otherwise support a means for selecting, based on an updated location of the UE or an updated measured RSRP, an updated TDD configuration from the first set, an updated SFI from the second set, or both. In some examples, the TDD and SFI component 630 may be configured as or otherwise support a means for transmitting, to the base station, signaling indicating the selected updated TDD configuration, the updated SFI, or both based on the selecting. In some examples, the communication component 635 may be configured as or otherwise support a means for communicating with the base station according to the updated TDD configuration, the updated SFI, or both based on transmitting the signaling indicating the updated TDD configuration, the updated SFI, or both.

In some examples, the TDD and SFI switching component 655 may be configured as or otherwise support a means for switching from communicating with the base station according to the TDD configuration, the SFI, or both to communicating with the base station according to the updated TDD configuration, the updated SFI, or both at a time indicated by a configured time period after transmitting the signaling indicating the selected updated TDD configuration, the updated SFI, or both.

In some examples, the RSRP and location component 625 may be configured as or otherwise support a means for transmitting, to the base station based on the communicating with the base station, signaling indicating an updated location of the UE or indicating an updated measured RSRP associated with communications from the base station, the wireless device, or both. In some examples, the TDD and SFI component 630 may be configured as or otherwise support a means for receiving, from the base station, at least one of an indication of an updated TDD configuration and an updated SFI for communications between the base station and the UE based on the updated location or the updated measured RSRP. In some examples, the communication component 635 may be configured as or otherwise support a means for communicating with the base station according to the updated TDD configuration, the updated SFI, or both.

In some examples, the base station corresponds to a serving cell of the UE. In some examples, the wireless device corresponds to a neighboring cell of the UE. In some examples, to support communicating with the base station, the communication component 635 may be configured as or otherwise support a means for communicating with the base station according to a full-duplex mode.

Figure 7:
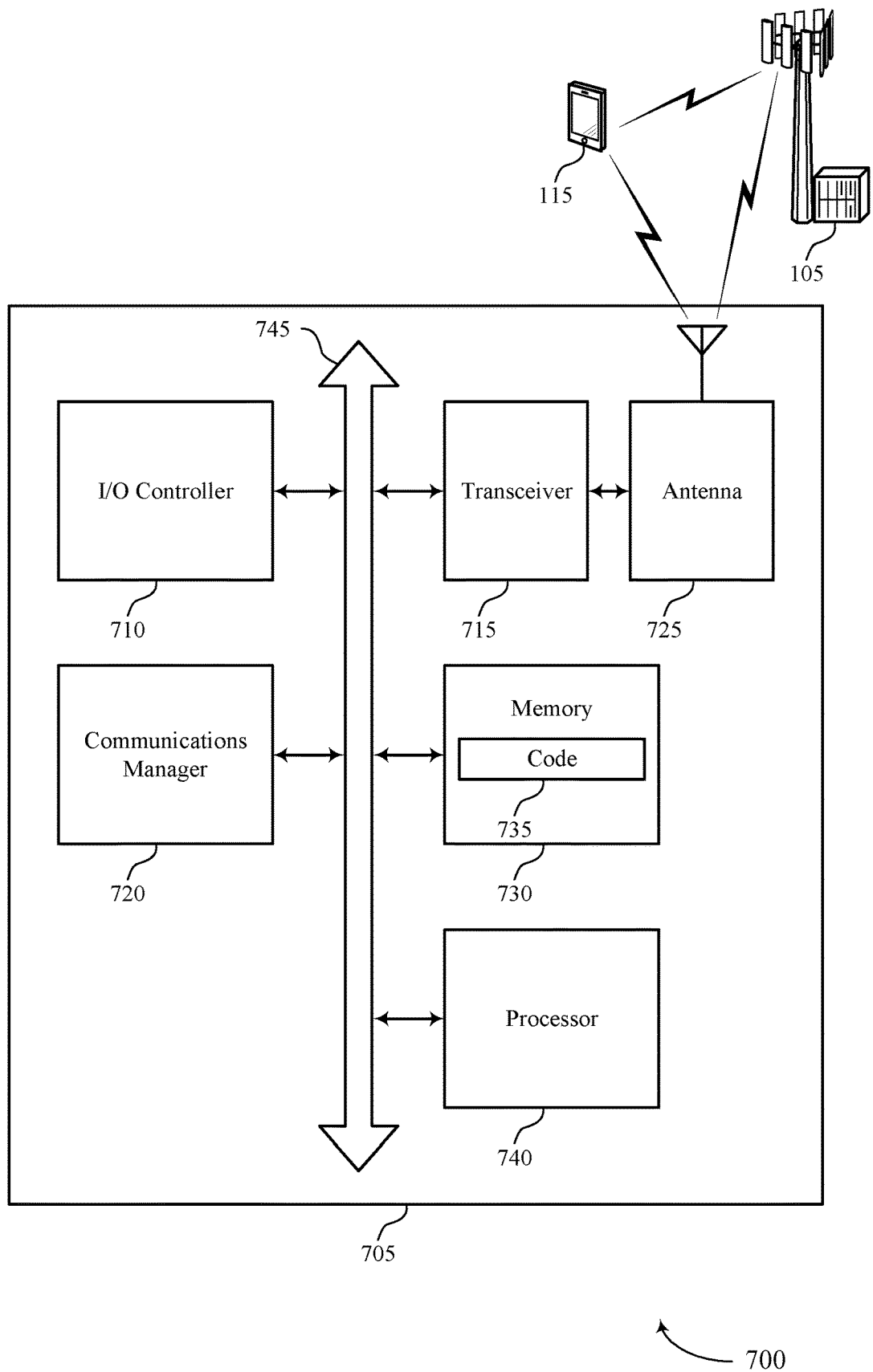
FIG. 7 shows a diagram of a system including a device that supports techniques for resource configurations based on channel metrics in accordance with various aspects of the present disclosure.

FIG. 7 shows a diagram of a system 700 including a device 705 that supports techniques for resource configurations based on channel metrics in accordance with various aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed)

to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for resource configurations based on channel metrics). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for transmitting, to a base station, signaling indicating a location of the UE and indicating a measured RSRP associated with communications from the base station, a wireless device, or both. The communications manager 720 may be configured as or otherwise support a means for receiving, from the base station and based on the transmitting, at least one of an indication of a TDD configuration and a SFI for communications between the base station and the UE. The communications manager 720 may be configured as or otherwise support a means for communicating with the base station according to the TDD configuration, the SFI, or both.

By including or configuring the communications manager 720 in accordance with examples as described herein, the device 705 may support techniques for resource configurations based on channel metrics, which may improve the quality and reliability of communications for the device 705. The supported techniques may include improve network operations, and, in some examples, may promote network efficiencies among other benefits.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for resource configurations based on channel metrics as described herein, or the processor 740 and the memory 730 may be otherwise configured to perform or support such operations.

Figure 8:
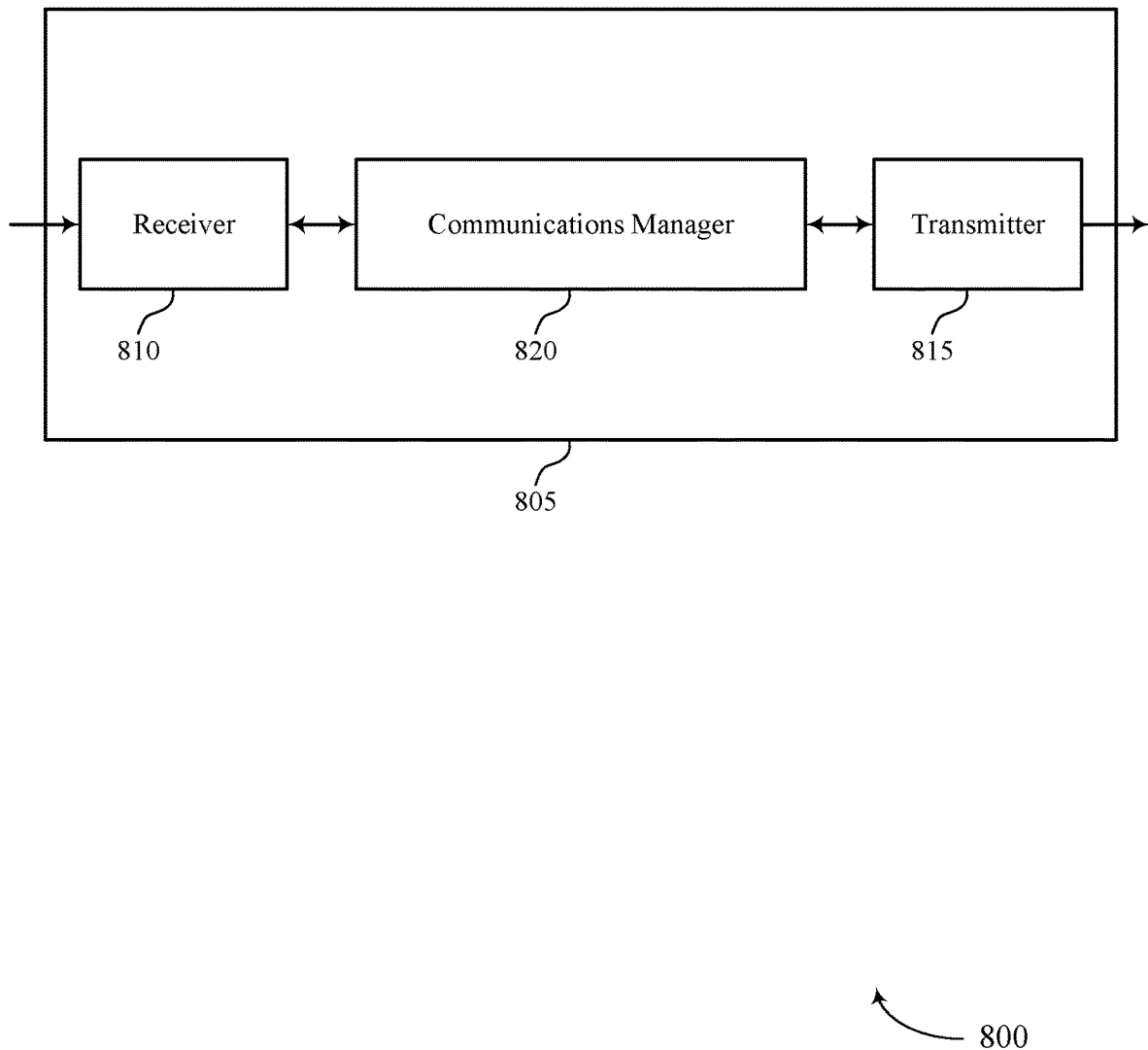
FIGS. 8 and 9 show block diagrams of devices that support techniques for resource configurations based on channel metrics in accordance with various aspects of the present disclosure.

FIG. 8 shows a block diagram 800 of a device 805 that supports techniques for resource configurations based on channel metrics in accordance with various aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for resource configurations based on channel metrics). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for resource configurations based on channel metrics). In some examples, the transmitter 815 may be co-located with a receiver 810 in a transceiver component. The transmitter 815 may utilize a single antenna or a set of multiple antennas.

The communications manager 820, the receiver 810, the transmitter 815, or various combinations thereof or various components thereof may be examples of means for performing various aspects of techniques for resource configurations based on channel metrics as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first network entity in accordance with examples as disclosed herein. For example, the communications manager 820 may be configured as or otherwise support a means for receiving, from a second network entity, signaling indicating a set of resource configurations. The communications manager 820 may be configured as or otherwise support a means for selecting, based on at least one of a measured RSRP indicated by a wireless device or a location of the wireless device, a resource configuration from the set for communications with the wireless device. The communications manager 820 may be configured as or otherwise support a means for communicating with the wireless device according to the selected resource configuration.

Additionally or alternatively, the communications manager 820 may support wireless communication at a first network entity in accordance with examples as disclosed herein. For example, the communications manager 820 may be configured as or otherwise support a means for receiving, from a UE, signaling indicating a location of the UE and indicating a measured RSRP associated with communications from the base station, a wireless device, or both. The communications manager 820 may be configured as or otherwise support a means for transmitting, to the UE based on the receiving, at least one of an indication of a TDD configuration and an SFI for communications between the base station and the UE. The communications manager 820 may be configured as or otherwise support a means for communicating with the UE according to the TDD configuration, the SFI, or both.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for resource configurations based on channel metrics, which may improve the quality and reliability of communications for the device 805. The supported techniques may include improve network operations, and, in some examples, may promote network efficiencies among other benefits.

Figure 9:
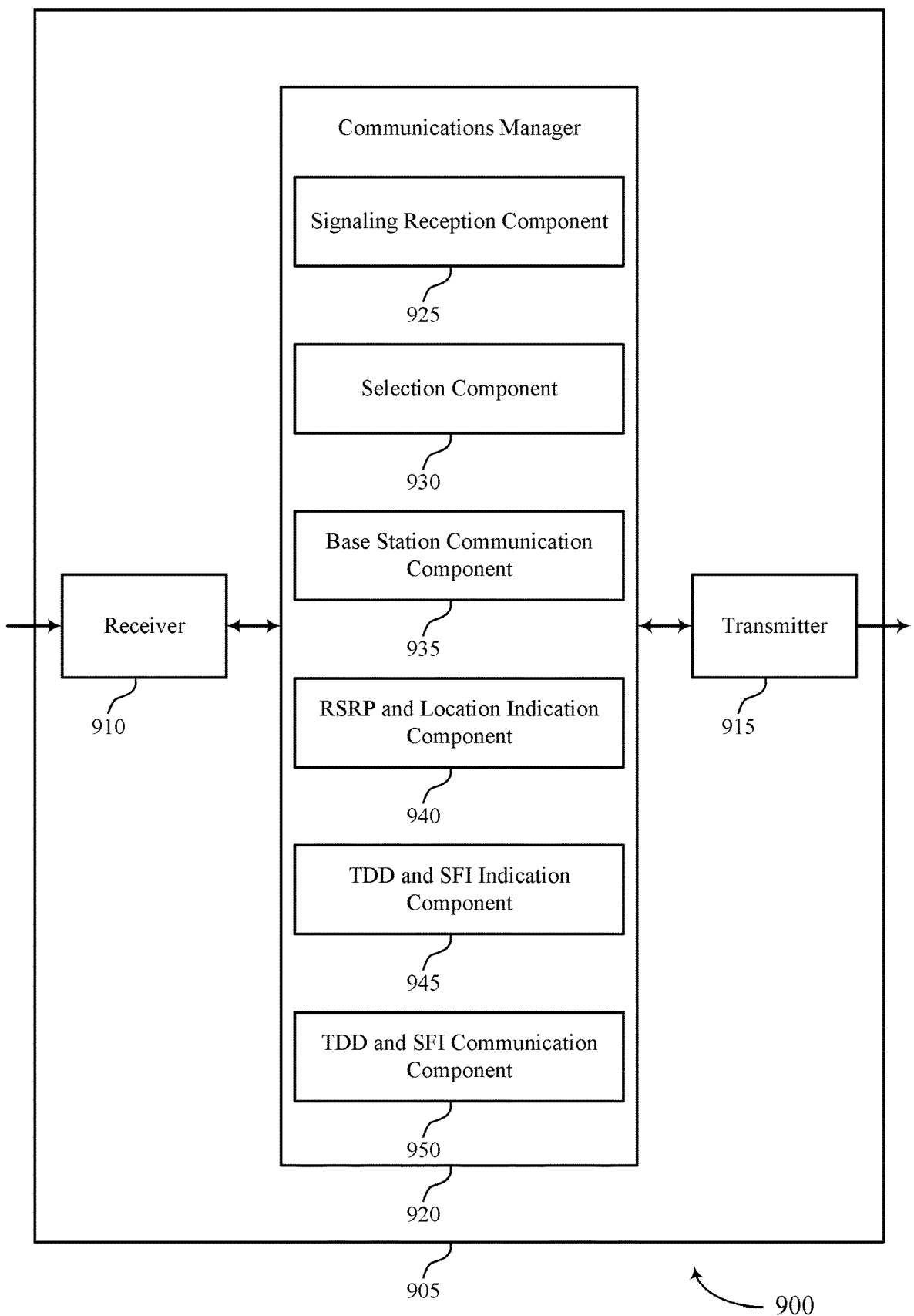

FIG. 9 shows a block diagram 900 of a device 905 that supports techniques for resource configurations based on channel metrics in accordance with various aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for resource configurations based on channel metrics). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for resource configurations based on channel metrics). In some examples, the transmitter 915 may be co-located with a receiver 910 in a transceiver component. The transmitter 915 may utilize a single antenna or a set of multiple antennas.

The device 905, or various components thereof, may be an example of means for performing various aspects of techniques for resource configurations based on channel metrics as described herein. For example, the communications manager 920 may include a signaling reception component 925, a selection component 930, a network communication component 935, an RSRP and location indication component 940, a TDD and SFI indication component 945, a TDD and SFI communication component 950, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first network entity in accordance with examples as disclosed herein. The signaling reception component 925 may be configured as or otherwise support a means for receiving, from a second network entity, signaling indicating a set of resource configurations. The selection component 930 may be configured as or otherwise support a means for selecting, based on at least one of a measured RSRP indicated by a wireless device or a location of the wireless device, a resource configuration from the set for communications with the wireless device. The network communication component 935 may be configured as or otherwise support a means for communicating with the wireless device according to the selected resource configuration.

Additionally or alternatively, the communications manager 920 may support wireless communication at a base station in accordance with examples as disclosed herein. The RSRP and location indication component 940 may be configured as or otherwise support a means for receiving, from a UE, signaling indicating a location of the UE and indicating a measured RSRP associated with communications from the base station, a wireless device, or both. The TDD and SFI indication component 945 may be configured as or otherwise support a means for transmitting, to the UE based on the receiving, at least one of an indication of a TDD configuration and an SFI for communications between the base station and the UE. The TDD and SFI communication component 950 may be configured as or otherwise support a means for communicating with the UE according to the TDD configuration, the SFI, or both.

Figure 10:
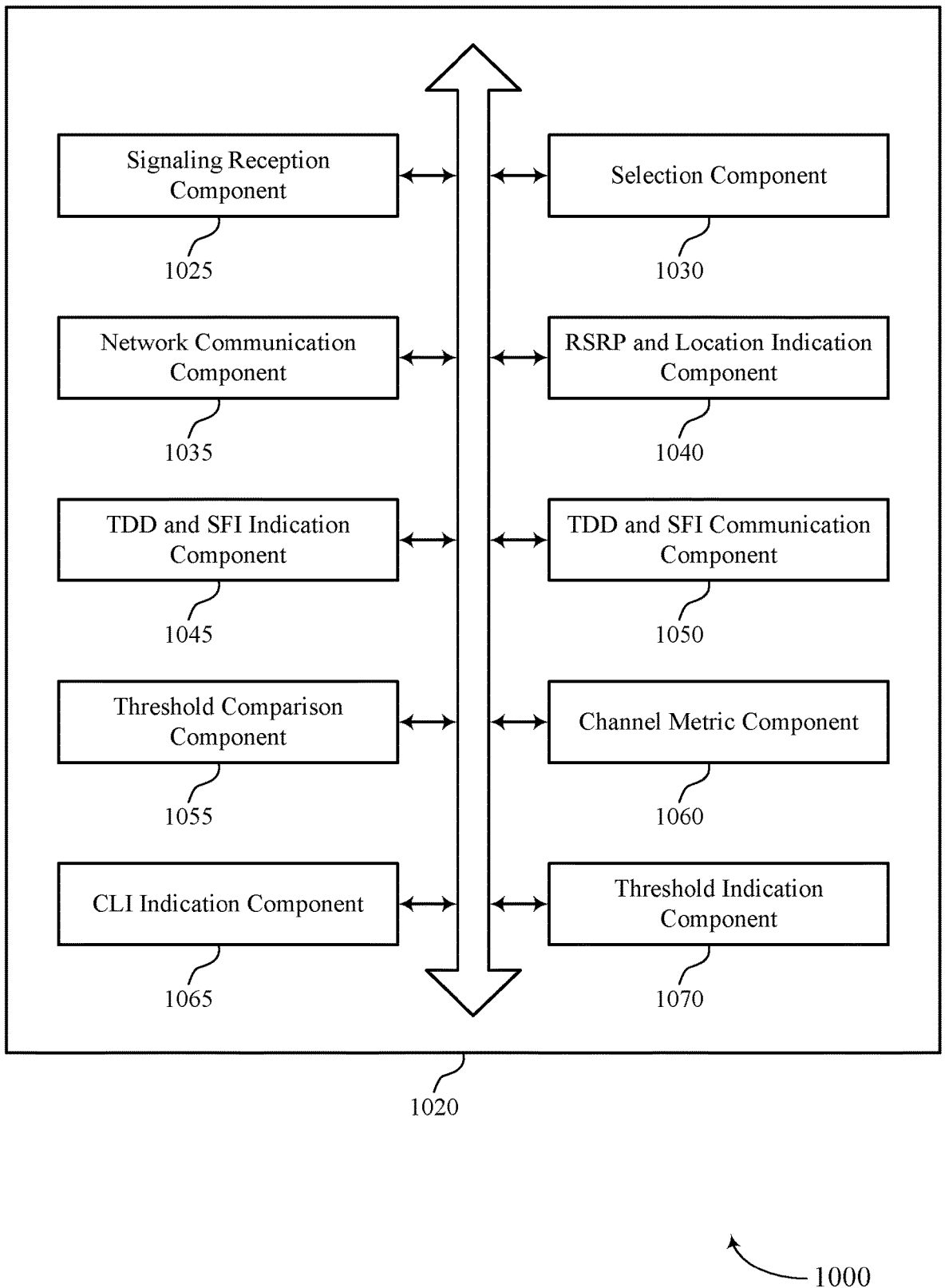
FIG. 10 shows a block diagram of a communications manager that supports techniques for resource configurations based on channel metrics in accordance with various aspects of the present disclosure.

FIG. 10 shows a block diagram 1000 of a communications manager 1020 that supports techniques for resource configurations based on channel metrics in accordance with various aspects of the present disclosure. The communications manager 1020 may be an example of aspects of a communications manager 820, a communications manager 920, or both, as described herein. The communications manager 1020, or various components thereof, may be an example of means for performing various aspects of techniques for resource configurations based on channel metrics as described herein. For example, the communications manager 1020 may include a signaling reception component 1025, a selection component 1030, a network communication component 1035, an RSRP and location indication component 1040, a TDD and SFI indication component 1045, a TDD and SFI communication component 1050, a threshold comparison component 1055, a channel metric component 1060, a CLI indication component 1065, a threshold indication component 1070, or any combination thereof. Each of these components may communicate, directly or indirectly, with one another (e.g., via one or more buses).

The communications manager 1020 may support wireless communication at a first network entity in accordance with examples as disclosed herein. The signaling reception component 1025 may be configured as or otherwise support a means for receiving, from a second network entity, signaling indicating a set of resource configurations. The selection component 1030 may be configured as or otherwise support a means for selecting, based on at least one of a measured RSRP indicated by a wireless device or a location of the wireless device, a resource configuration from the set for communications with the wireless device. The network communication component 1035 may be configured as or otherwise support a means for communicating with the wireless device according to the selected resource configuration. In some examples, the resource configurations include at least one or a first set of TDD configurations, a second set of SFIs, and a third set of DU resource configurations. In some examples, the first network entity corresponds to a DU or an IAB node, and the second network entity corresponds to a CU.

In some examples, the threshold comparison component 1055 may be configured as or otherwise support a means for receiving, from the second network entity, signaling indicating a first set of RSRP thresholds each associated with a respective one of the set of resource configurations and indicating a second set of location thresholds each associated with a respective one of the set of resource configurations. In some examples, the threshold comparison component 1055 may be configured as or otherwise support a means for comparing the measured RSRP to the first set of RSRP thresholds, the location of the wireless device to the second set of location thresholds, or both, where the selecting is based on the comparing. In some examples, each resource configuration within the set is associated with the first network entity and the second network entity.

In some examples, the threshold comparison component 1055 may be configured as or otherwise support a means for receiving, from the second network entity, signaling indicating a set of thresholds each associated with a respective one of the set of resource configurations. In some examples, the channel metric component 1060 may be configured as or otherwise support a means for comparing a channel metric corresponding to communications with the wireless device to the set of thresholds, where the selecting is based on the comparing. In some examples, the channel metric includes a CLI, an uplink transmission power, a downlink transmission power, or a combination thereof. In some examples, to support communicating with the wireless device, the network communication component 1035 may be configured as or otherwise support a means for communicating with the wireless device according to a full-duplex mode.

Additionally or alternatively, the communications manager 1020 may support wireless communication at a base station in accordance with examples as disclosed herein. The RSRP and location indication component 1040 may be configured as or otherwise support a means for receiving, from a UE, signaling indicating a location of the UE and indicating a measured RSRP associated with communications from the base station, a second wireless device, or both. The TDD and SFI indication component 1045 may be configured as or otherwise support a means for transmitting, to the UE based on the receiving, at least one of an indication of a TDD configuration and an SFI for communications between the base station and the UE. The TDD and SFI communication component 1050 may be configured as or otherwise support a means for communicating with the UE according to the TDD configuration, the SFI, or both.

In some examples, the CLI indication component 1065 may be configured as or otherwise support a means for receiving, from the UE, signaling indicating a CLI associated with communications from the base station, the wireless device or both, where transmitting the at least one of the indication of the TDD configuration and the SFI is based on receiving the signaling indicating the CLI.

In some examples, the TDD and SFI indication component 1045 may be configured as or otherwise support a means for transmitting, to the UE, signaling indicating a first set of TDD configurations including at least the TDD configuration, a second set of SFIs including at least the SFI, or both, where communicating with the UE is based on transmitting the signaling indicating the first set, the second set, or both.

In some examples, the TDD and SFI indication component 1045 may be configured as or otherwise support a means for transmitting, to the UE, signaling indicating an updated TDD configuration from the first set, an updated SFI from the second set, or both. In some examples, the TDD and SFI communication component 1050 may be configured as or otherwise support a means for communicating with the UE according to the updated TDD configuration, the updated SFI, or both based on transmitting the signaling indicating the updated TDD configuration, the updated SFI, or both.

In some examples, the threshold indication component 1070 may be configured as or otherwise support a means for transmitting signaling indicating a first set of RSRP thresholds each associated with a respective one of the first set of TDD configurations, one of the second set of SFIs, or both and indicating a second set of location thresholds each associated with a respective one of the first set of TDD configurations, one of the second set of SFIs, or both, where communicating with the UE is based on transmitting the signaling indicating the first set of RSRP thresholds and indicating the second set of location thresholds.

In some examples, the TDD and SFI indication component 1045 may be configured as or otherwise support a means for receiving, from the UE, signaling indicating an updated TDD configuration from the first set, an updated SFI from the second set, or both. In some examples, the TDD and SFI communication component 1050 may be configured as or otherwise support a means for communicating with the UE according to the updated TDD configuration, the updated SFI, or both based on receiving the signaling indicating the updated TDD configuration, the updated SFI, or both.

In some examples, the RSRP and location indication component 1040 may be configured as or otherwise support a means for receiving, from the UE based on the communicating with the UE, signaling indicating an updated location of the UE or indicating an updated measured RSRP associated with communications from the base station, the wireless device, or both. In some examples, the TDD and SFI indication component 1045 may be configured as or otherwise support a means for transmitting, to the UE, at least one of an indication of an updated TDD configuration and an updated SFI for communications between the base station and the UE based on the updated location or the updated measured RSRP. In some examples, the TDD and SFI communication component 1050 may be configured as or otherwise support a means for communicating with the UE according to the updated TDD configuration, the updated SFI, or both.

Figure 11:
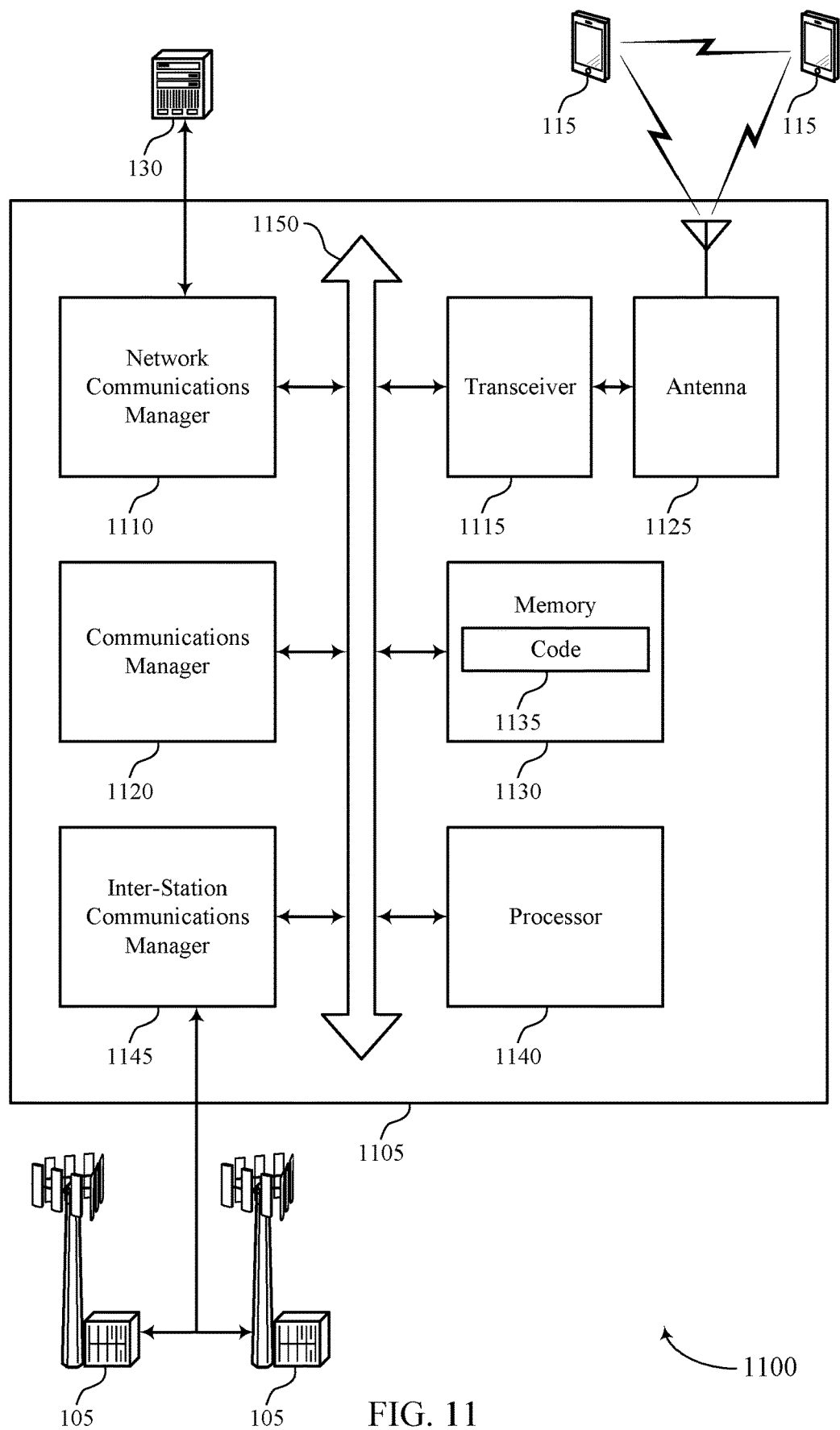
FIG. 11 shows a diagram of a system including a device that supports techniques for resource configurations based on channel metrics in accordance with various aspects of the present disclosure.

FIG. 11 shows a diagram of a system 1100 including a device 1105 that supports techniques for resource configurations based on channel metrics in accordance with various aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for resource configurations based on channel metrics). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a first network entity in accordance with examples as disclosed herein. For example, the communications manager 1120 may be configured as or otherwise support a means for receiving, from a second network entity, signaling indicating a set of resource configurations. The communications manager 1120 may be configured as or otherwise support a means for selecting, based on at least one of a measured RSRP indicated by a wireless device or a location of the wireless device, a resource configuration from the set for communications with the wireless device. The communications manager 1120 may be configured as or otherwise support a means for communicating with the wireless device according to the selected resource configuration.

Additionally or alternatively, the communications manager 1120 may support wireless communication at a base station in accordance with examples as disclosed herein. For example, the communications manager 1120 may be configured as or otherwise support a means for receiving, from a UE, signaling indicating a location of the UE and indicating a measured RSRP associated with communications from the base station, a wireless device, or both. The communications manager 1120 may be configured as or otherwise support a means for transmitting, to the UE based on the receiving, at least one of an indication of a TDD configuration and an SFI for communications between the base station and the UE. The communications manager 1120 may be configured as or otherwise support a means for communicating with the UE according to the TDD configuration, the SFI, or both.

By including or configuring the communications manager 1120 in accordance with examples as described herein, the device 1105 may support techniques for resource configurations based on channel metrics, which may improve the quality and reliability of communications for the device 1105. The supported techniques may include improve network operations, and, in some examples, may promote network efficiencies among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for resource configurations based on channel metrics as described herein, or the processor 1140 and the memory 1130 may be otherwise configured to perform or support such operations.

Figure 12:
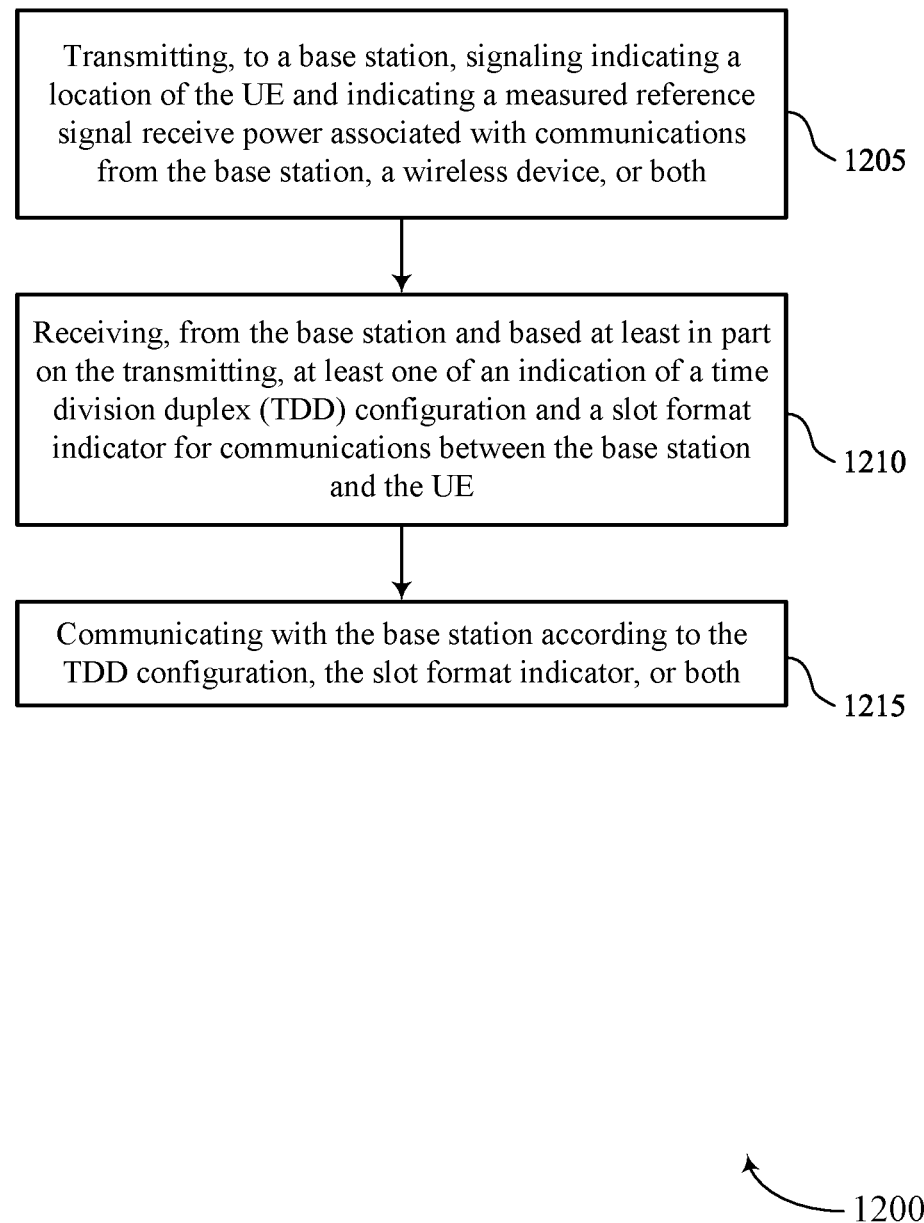
FIGS. 12 through 17 show flowcharts illustrating methods that support techniques for resource configurations based on channel metrics in accordance with various aspects of the present disclosure.

FIG. 12 shows a flowchart illustrating a method 1200 that supports techniques for resource configurations based on channel metrics in accordance with various aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include transmitting, to a base station, signaling indicating a location of the UE and indicating a measured RSRP associated with communications from the base station, a wireless device, or both. The operations of 1205 may be performed in accordance with examples as disclosed herein. In some examples, aspects of the operations of 1205 may be performed by an RSRP and location component 625 as described with reference to FIG. 6.

At 1210, the method may include receiving, from the base station and based on the transmitting, at least one of an indication of a TDD configuration and an SFI for communications between the base station and the UE. The operations of 1210 may be performed in accordance with examples as disclosed herein. In some examples, aspects of the operations of 1210 may be performed by a TDD and SFI component 630 as described with reference to FIG. 6.

At 1215, the method may include communicating with the base station according to the TDD configuration, the SFI, or both. The operations of 1215 may be performed in accordance with examples as disclosed herein. In some examples, aspects of the operations of 1215 may be performed by a communication component 635 as described with reference to FIG. 6.

Figure 13:
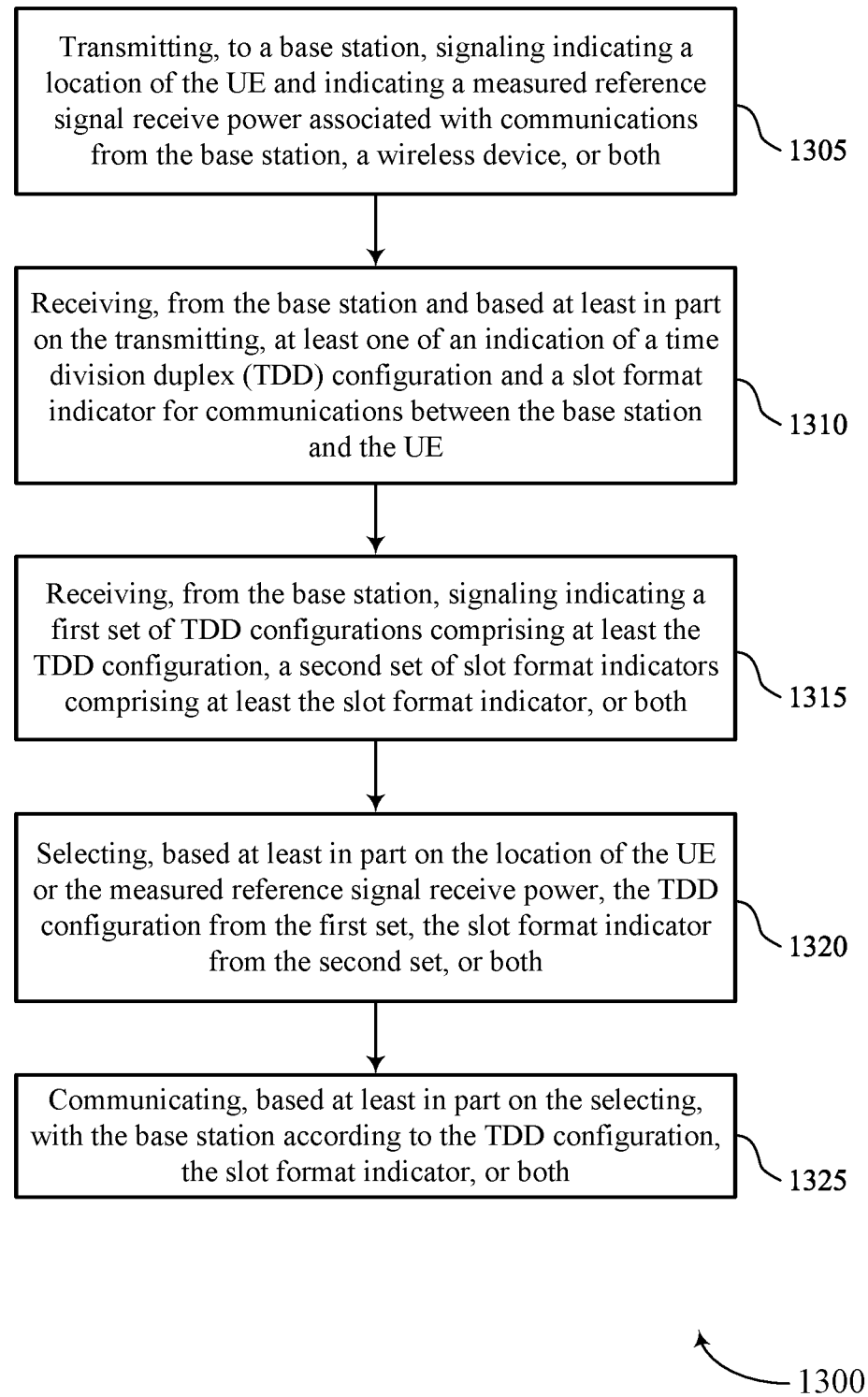

FIG. 13 shows a flowchart illustrating a method 1300 that supports techniques for resource configurations based on channel metrics in accordance with various aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, signaling indicating a location of the UE and indicating a measured RSRP associated with communications from the base station, a wireless device, or both. The operations of 1305 may be performed in accordance with examples as disclosed herein. In some examples, aspects of the operations of 1305 may be performed by an RSRP and location component 625 as described with reference to FIG. 6.

At 1310, the method may include receiving, from the base station and based on the transmitting, at least one of an indication of a TDD configuration and an SFI for communications between the base station and the UE. The operations of 1310 may be performed in accordance with examples as disclosed herein. In some examples, aspects of the operations of 1310 may be performed by a TDD and SFI component 630 as described with reference to FIG. 6.

At 1315, the method may include receiving, from the base station, signaling indicating a first set of TDD configurations including at least the TDD configuration, a second set of SFIs including at least the SFI, or both. The operations of 1315 may be performed in accordance with examples as disclosed herein. In some examples, aspects of the operations of 1315 may be performed by a TDD and SFI component 630 as described with reference to FIG. 6.

At 1320, the method may include selecting, based on the location of the UE or the measured RSRP, the TDD configuration from the first set, the SFI from the second set, or both. The operations of 1320 may be performed in accordance with examples as disclosed herein. In some examples, aspects of the operations of 1320 may be performed by a TDD and SFI selection component 645 as described with reference to FIG. 6.

At 1325, the method may include communicating, based on the selecting, with the base station according to the TDD configuration, the SFI, or both. The operations of 1325 may be performed in accordance with examples as disclosed herein. In some examples, aspects of the operations of 1325 may be performed by a communication component 635 as described with reference to FIG. 6.

Figure 14:
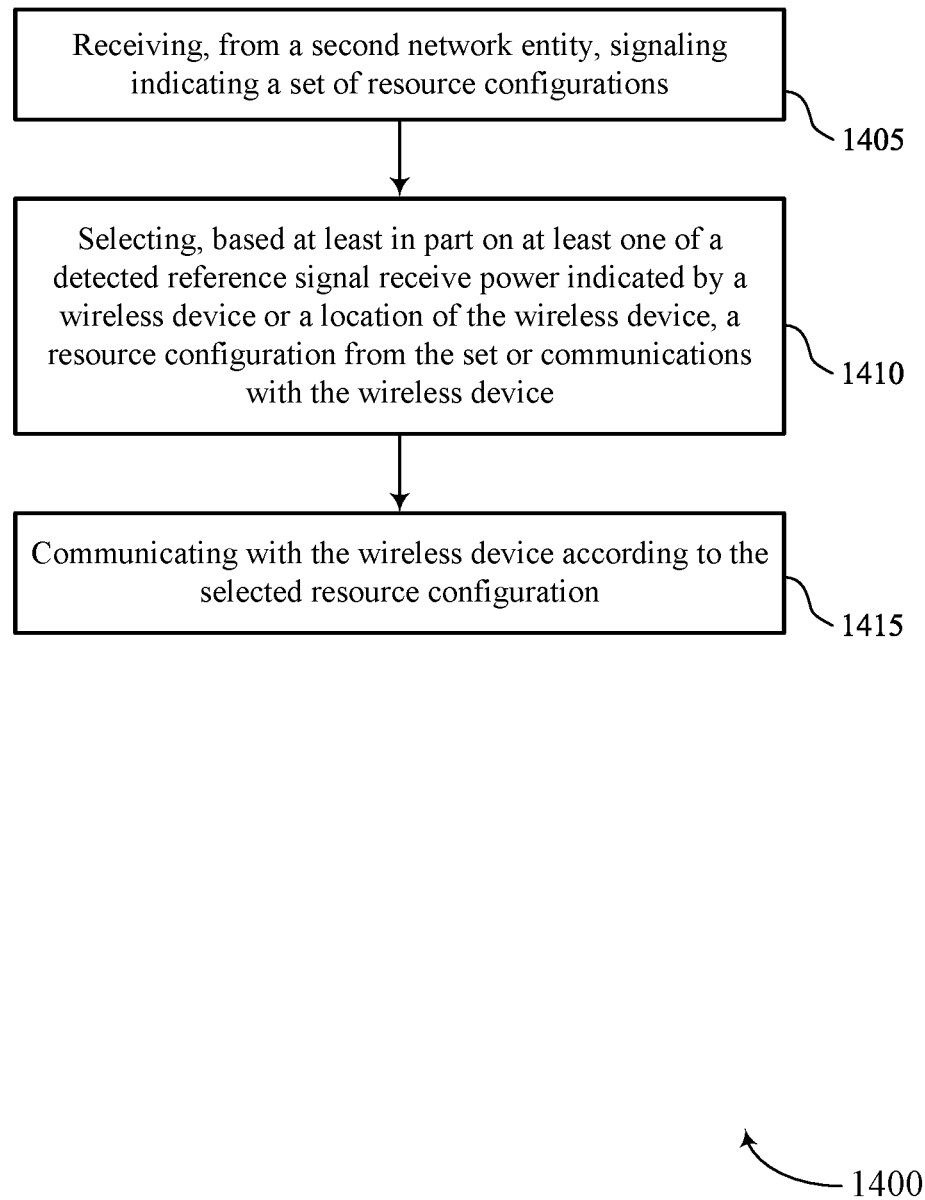

FIG. 14 shows a flowchart illustrating a method 1400 that supports techniques for resource configurations based on channel metrics in accordance with various aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include receiving, from a second network entity, signaling indicating a set of resource configurations. The operations of 1405 may be performed in accordance with examples as disclosed herein. In some examples, aspects of the operations of 1405 may be performed by a signaling reception component 1025 as described with reference to FIG. 10.

At 1410, the method may include selecting, based on at least one of a measured RSRP indicated by a wireless device or a location of the wireless device, a resource configuration from the set for communications with the wireless device. The operations of 1410 may be performed in accordance with examples as disclosed herein. In some examples, aspects of the operations of 1410 may be performed by a selection component 1030 as described with reference to FIG. 10.

At 1415, the method may include communicating with the wireless device according to the selected resource configuration. The operations of 1415 may be performed in accordance with examples as disclosed herein. In some examples, aspects of the operations of 1415 may be performed by a network communication component 1035 as described with reference to FIG. 10.

Figure 15:
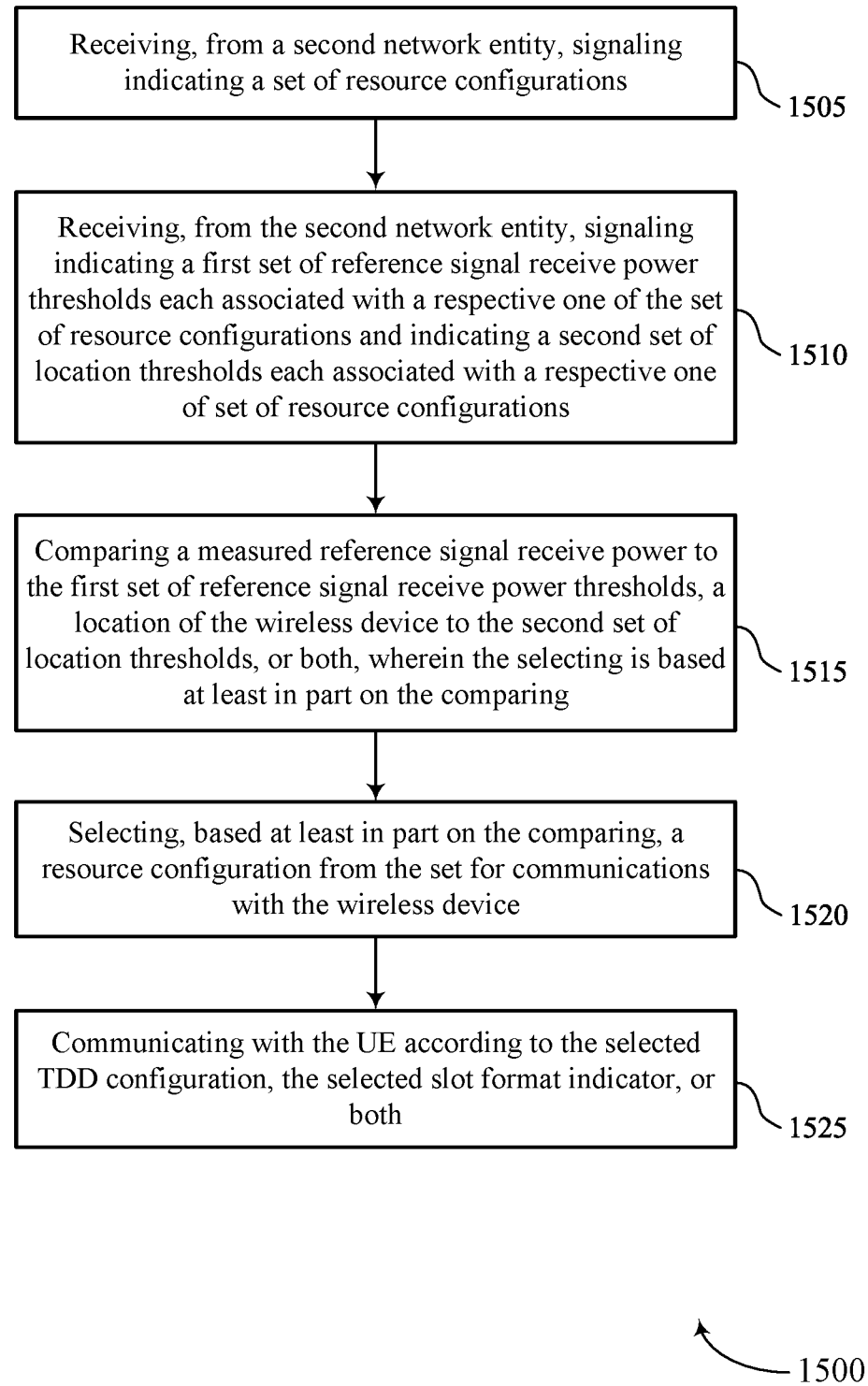

FIG. 15 shows a flowchart illustrating a method 1500 that supports techniques for resource configurations based on channel metrics in accordance with various aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving, from a second network entity, signaling indicating a set of resource configurations. The operations of 1505 may be performed in accordance with examples as disclosed herein. In some examples, aspects of the operations of 1505 may be performed by a signaling reception component 1025 as described with reference to FIG. 10.

At 1510, the method may include receiving, from the second network entity, signaling indicating a first set of RSRP thresholds each associated with a respective one of the set of resource configurations and indicating a second set of location thresholds each associated with a respective one of the set of resource configurations. The operations of 1510 may be performed in accordance with examples as disclosed herein. In some examples, aspects of the operations of 1510 may be performed by a threshold comparison component 1055 as described with reference to FIG. 10.

At 1515, the method may include comparing a measured RSRP to the first set of RSRP thresholds, a location of the wireless device to the second set of location thresholds, or both, where the selecting is based on the comparing. The operations of 1515 may be performed in accordance with examples as disclosed herein. In some examples, aspects of the operations of 1515 may be performed by a threshold comparison component 1055 as described with reference to FIG. 10.

At 1520, the method may include selecting, based on the comparing, a resource configuration from the set for communications with the wireless device. The operations of 1520 may be performed in accordance with examples as disclosed herein. In some examples, aspects of the operations of 1520 may be performed by a selection component 1030 as described with reference to FIG. 10.

At 1525, the method may include communicating with the wireless device according to the selected resource configuration. The operations of 1525 may be performed in accordance with examples as disclosed herein. In some examples, aspects of the operations of 1525 may be performed by a network communication component 1035 as described with reference to FIG. 10.

Figure 16:
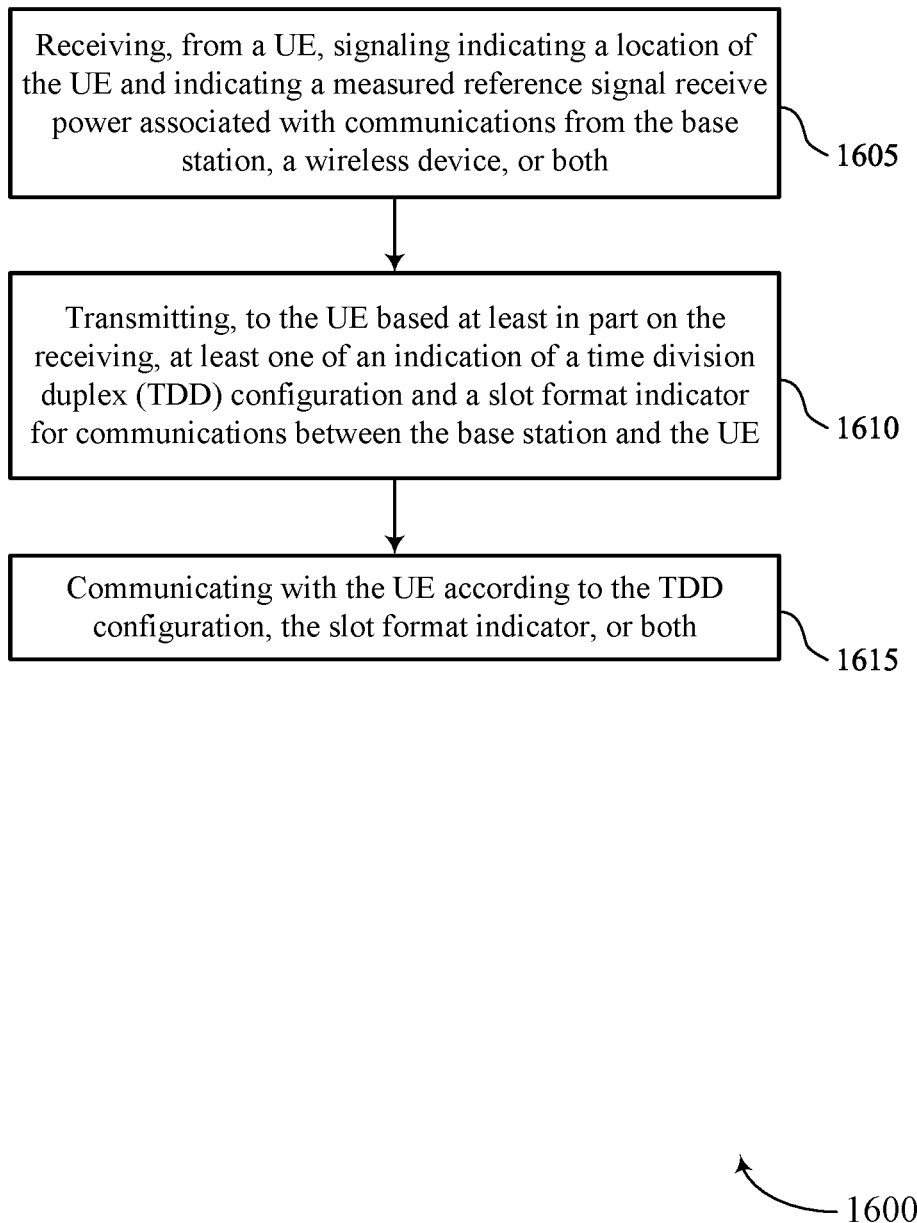

FIG. 16 shows a flowchart illustrating a method 1600 that supports techniques for resource configurations based on channel metrics in accordance with various aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, signaling indicating a location of the UE and indicating a measured RSRP associated with communications from the base station, a wireless device, or both. The operations of 1605 may be performed in accordance with examples as disclosed herein. In some examples, aspects of the operations of 1605 may be performed by an RSRP and location indication component 1040 as described with reference to FIG. 10.

At 1610, the method may include transmitting, to the UE based on the receiving, at least one of an indication of a TDD configuration and an SFI for communications between the base station and the UE. The operations of 1610 may be performed in accordance with examples as disclosed herein. In some examples, aspects of the operations of 1610 may be performed by a TDD and SFI indication component 1045 as described with reference to FIG. 10.

At 1615, the method may include communicating with the UE according to the TDD configuration, the SFI, or both. The operations of 1615 may be performed in accordance with examples as disclosed herein. In some examples, aspects of the operations of 1615 may be performed by a TDD and SFI communication component 1050 as described with reference to FIG. 10.

Figure 17:
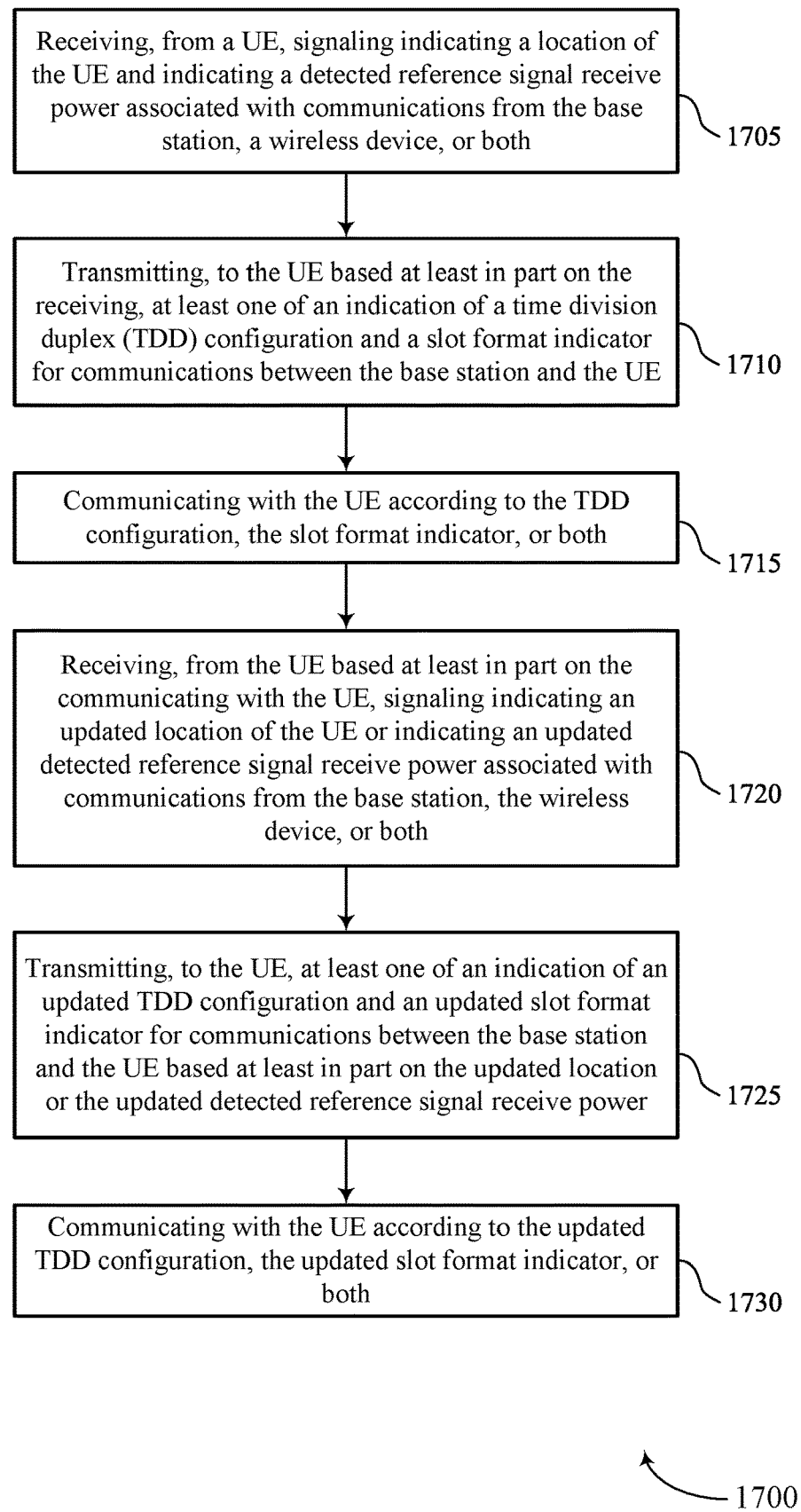

FIG. 17 shows a flowchart illustrating a method 1700 that supports techniques for resource configurations based on channel metrics in accordance with various aspects of the present disclosure. The operations of the method 1700 may be implemented by a base station or its components as described herein. For example, the operations of the method 1700 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, signaling indicating a location of the UE and indicating a measured RSRP associated with communications from the base station, a wireless device, or both. The operations of 1705 may be performed in accordance with examples as disclosed herein. In some examples, aspects of the operations of 1705 may be performed by an RSRP and location indication component 1040 as described with reference to FIG. 10.

At 1710, the method may include transmitting, to the UE based on the receiving, at least one of an indication of a TDD configuration and an SFI for communications between the base station and the UE. The operations of 1710 may be performed in accordance with examples as disclosed herein. In some examples, aspects of the operations of 1710 may be performed by a TDD and SFI indication component 1045 as described with reference to FIG. 10.

At 1715, the method may include communicating with the UE according to the TDD configuration, the SFI, or both. The operations of 1715 may be performed in accordance with examples as disclosed herein. In some examples, aspects of the operations of 1715 may be performed by a TDD and SFI communication component 1050 as described with reference to FIG. 10.

At 1720, the method may include receiving, from the UE based on the communicating with the UE, signaling indicating an updated location of the UE or indicating an updated measured RSRP associated with communications from the base station, the wireless device, or both. The operations of 1720 may be performed in accordance with examples as disclosed herein. In some examples, aspects of the operations of 1720 may be performed by an RSRP and location indication component 1040 as described with reference to FIG. 10.

At 1725, the method may include transmitting, to the UE, at least one of an indication of an updated TDD configuration and an updated SFI for communications between the base station and the UE based on the updated location or the updated measured RSRP. The operations of 1725 may be performed in accordance with examples as disclosed herein. In some examples, aspects of the operations of 1725 may be performed by a TDD and SFI indication component 1045 as described with reference to FIG. 10.

At 1730, the method may include communicating with the UE according to the updated TDD configuration, the updated SFI, or both. The operations of 1730 may be performed in accordance with examples as disclosed herein. In some examples, aspects of the operations of 1730 may be performed by a TDD and SFI communication component 1050 as described with reference to FIG. 10.

The following provides an overview of aspects of the present disclosure:

Aspect 1: A method for wireless communication at a UE, comprising: transmitting, to a base station, signaling indicating a location of the UE and indicating a measured RSRP associated with communications from the base station, a wireless device, or both; and receiving, from the base station and based at least in part on the transmitting, at least one of an indication of a TDD configuration and an SFI for communications between the base station and the UE; and communicating with the base station according to the TDD configuration, the SFI, or both.

Aspect 2: The method of aspect 1, further comprising: transmitting, to the base station, signaling indicating a CLI associated with communications from the base station, the wireless device, or both, wherein receiving the at least one of the indication of the TDD configuration and the SFI is based at least in part on transmitting the signaling indicating the CLI.

Aspect 3: The method of any of aspects 1 through 2, further comprising: receiving, from the base station, signaling indicating a first set of TDD configurations comprising at least the TDD configuration, a second set of SFIs comprising at least the SFI, or both; and selecting, based at least in part on the location of the UE or the measured RSRP, the TDD configuration from the first set, the SFI from the second set, or both, wherein the communicating is based at least in part on the selecting.

Aspect 4: The method of aspect 3, further comprising: receiving, from the base station, signaling indicating an updated TDD configuration from the first set, indicating an updated SFI from the second set, or both; and communicating with the base station according to the updated TDD configuration, the updated SFI, or both.

Aspect 5: The method of aspect 4, further comprising: switching from communicating with the base station according to the TDD configuration, the SFI, or both to communicating with the base station according to the updated TDD configuration, the updated SFI, or both at a time indicated by a configured time period after receiving the signaling indicating the selected updated TDD configuration, the updated SFI, or both.

Aspect 6: The method of any of aspects 4 through 5, wherein receiving the signaling comprises: receiving, from the base station, the signaling via DCI or via a MAC control element (MAC-CE).

Aspect 7: The method of any of aspects 3 through 6, wherein each TDD configuration within the first set of TDD configurations is broadcast by the base station to the wireless device.

Aspect 8: The method of any of aspects 3 through 7, further comprising: signaling indicating a first set of RSRP thresholds each associated with a respective one of the first set of TDD configurations, one of the second set of SFIs, or both and indicating a second set of location thresholds each associated with a respective one of the first set of TDD configurations, one of the second set of SFIs, or both; and identifying that the measured RSRP satisfies an RSRP threshold from the first set of RSRP thresholds that is associated with the TDD configuration or the SFI or that the location of the UE satisfies a location threshold from the second set of SFIs that is associated with the TDD configuration or the SFI, wherein the selecting is based at least in part on the identifying.

Aspect 9: The method of aspect 8, further comprising: transmitting, to the base station, a report indicating that the measured RSRP satisfies the RSRP threshold or that the location of the UE satisfies the location threshold from the second set of SFIs, wherein the communicating is based at least in part on transmitting the report.

Aspect 10: The method of any of aspects 3 through 9, further comprising: selecting, based at least in part on an updated location of the UE or an updated measured RSRP, an updated TDD configuration from the first set, an updated SFI from the second set, or both; transmitting, to the base station, signaling indicating the selected updated TDD configuration, the updated SFI, or both based at least in part on the selecting; and communicating with the base station according to the updated TDD configuration, the updated SFI, or both based at least in part on transmitting the signaling indicating the updated TDD configuration, the updated SFI, or both.

Aspect 11: The method of aspect 10, further comprising: switching from communicating with the base station according to the TDD configuration, the SFI, or both to communicating with the base station according to the updated TDD configuration, the updated SFI, or both at a time indicated by a configured time period after transmitting the signaling indicating the selected updated TDD configuration, the updated SFI, or both.

Aspect 12: The method of any of aspects 1 through 11, further comprising: transmitting, to the base station based at least in part on the communicating with the base station, signaling indicating an updated location of the UE or indicating an updated measured RSRP associated with communications from the base station, the wireless device, or both; receiving, from the base station, at least one of an indication of an updated TDD configuration and an updated SFI for communications between the base station and the UE based at least in part on the updated location or the updated measured RSRP; and communicating with the base station according to the updated TDD configuration, the updated SFI, or both.

Aspect 13: The method of any of aspects 1 through 12, wherein the base station corresponds to a serving cell of the UE; and the wireless device corresponds to a neighboring cell of the UE.

Aspect 14: The method of any of aspects 1 through 13, wherein communicating with the base station comprises: communicating with the base station according to a full-duplex mode.

Aspect 15: A method for wireless communication at a first network entity, comprising: receiving, from a second network entity, signaling indicating a first set of resource configurations; selecting, based at least in part on at least one of a measured RSRP indicated by a wireless device or a location of the wireless device, a resource configuration from the set for communications with the wireless device; and communicating with the wireless device according to the selected resource configuration.

Aspect 16: The method of aspect 15, further comprising: receiving, from the second network entity, signaling indicating a first set of RSRP thresholds each associated with a respective one of the set of resource configurations and indicating a second set of location thresholds each associated with a respective one of the set of resource configurations; and comparing the measured RSRP to the first set of RSRP thresholds, the location of the wireless device to the second set of location thresholds, or both, wherein the selecting is based at least in part on the comparing.

Aspect 17: The method of any of aspects 15 through 16, wherein each resource configuration within the set is associated with the first network entity and the second network entity.

Aspect 18: The method of any of aspects 15 through 17, further comprising: receiving, from the second network entity, signaling indicating a set of thresholds each associated with a respective one of the set of resource configurations; and comparing a channel metric corresponding to communications with the wireless device to the set of thresholds, wherein the selecting is based at least in part on the comparing.

Aspect 19: The method of aspect 18, wherein the channel metric comprises a CLI, an uplink transmission power, a downlink transmission power, or a combination thereof.

Aspect 20: The method of any of aspects 15 through 19, wherein the set of resource configurations comprises at least one of a first set of TDD configurations, a second set of SFIs, and a third set of DU resource configurations.

Aspect 21: The method of any of aspects 15 through 20, wherein the first network entity corresponds to a DU of an integrated access and backhaul node; and the second network entity corresponds to a CU.

Aspect 22: The method of any of aspects 15 through 21, wherein communicating with the wireless device comprises: communicating with the wireless device according to a full-duplex mode.

Aspect 23: A method for wireless communication at a base station, comprising: receiving, from a UE, signaling indicating a location of the UE and indicating a measured RSRP associated with communications from the base station, a wireless device, or both; and transmitting, to the UE based at least in part on the receiving, at least one of an indication of a TDD configuration and an SFI for communications between the base station and the UE; and communicating with the UE according to the TDD configuration, the SFI, or both.

Aspect 24: The method of aspect 23, further comprising: receiving, from the UE, signaling indicating a CLI associated with communications from the base station, the wireless device, or both, wherein transmitting the at least one of the indication of the TDD configuration and the SFI is based at least in part on receiving the signaling indicating the CLI.

Aspect 25: The method of any of aspects 23 through 24, further comprising: transmitting, to the UE, signaling indicating a first set of TDD configurations comprising at least the TDD configuration, a second set of SFIs comprising at least the SFI, or both, wherein communicating with the UE is based at least in part on transmitting the signaling indicating the first set, the second set, or both.

Aspect 26: The method of aspect 25, further comprising: transmitting, to the UE, signaling indicating an updated TDD configuration from the first set, an updated SFI from the second set, or both; and communicating with the UE according to the updated TDD configuration, the updated SFI, or both based at least in part on transmitting the signaling indicating the updated TDD configuration, the updated SFI, or both.

Aspect 27: The method of any of aspects 25 through 26, further comprising: transmitting signaling indicating a first set of RSRP thresholds each associated with a respective one of the first set of TDD configurations, one of the second set of SFIs, or both and indicating a second set of location thresholds each associated with a respective one of the first set of TDD configurations, one of the second set of SFIs, or both, wherein communicating with the UE is based at least in part on transmitting the signaling indicating the first set of RSRP thresholds and indicating the second set of location thresholds.

Aspect 28: The method of any of aspects 25 through 27, further comprising: receiving, from the UE, signaling indicating an updated TDD configuration from the first set, an updated SFI from the second set, or both; and communicating with the UE according to the updated TDD configuration, the updated SFI, or both based at least in part on receiving the signaling indicating the updated TDD configuration, the updated SFI, or both.

Aspect 29: The method of any of aspects 23 through 28, further comprising: receiving, from the UE based at least in part on the communicating with the UE, signaling indicating an updated location of the UE or indicating an updated measured RSRP associated with communications from the base station, the wireless device, or both; transmitting, to the UE, at least one of an indication of an updated TDD configuration and an updated SFI for communications between the base station and the UE based at least in part on the updated location or the updated measured RSRP; and communicating with the UE according to the updated TDD configuration, the updated SFI, or both.

Aspect 30: An apparatus for wireless communication at a UE, comprising a processor; memory coupled with the processor; and instructions stored in the memory and executable by the processor to cause the apparatus to perform a method of any of aspects 1 through 14.

Aspect 31: An apparatus for wireless communication at a UE, comprising at least one means for performing a method of any of aspects 1 through 14.

Aspect 32: A non-transitory computer-readable medium storing code for wireless communication at a UE, the code comprising instructions executable by a processor to perform a method of any of aspects 1 through 14.

Aspect 33: An apparatus for wireless communication at a first network entity, comprising a processor; memory coupled with the processor; and instructions stored in the memory and executable by the processor to cause the apparatus to perform a method of any of aspects 15 through 22.

Aspect 34: An apparatus for wireless communication at a first network entity, comprising at least one means for performing a method of any of aspects 15 through 22.

Aspect 35: A non-transitory computer-readable medium storing code for wireless communication at a first network entity, the code comprising instructions executable by a processor to perform a method of any of aspects 15 through 22.

Aspect 36: An apparatus for wireless communication at a base station, comprising a processor; memory coupled with the processor; and instructions stored in the memory and executable by the processor to cause the apparatus to perform a method of any of aspects 23 through 29.

Aspect 37: An apparatus for wireless communication at a base station, comprising at least one means for performing a method of any of aspects 23 through 29.

Aspect 38: A non-transitory computer-readable medium storing code for wireless communication at a base station, the code comprising instructions executable by a processor to perform a method of any of aspects 23 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting, to a base station, signaling indicating a location of the UE and indicating a measured reference signal receive power associated with communications from the base station, a wireless device, or both;
    receiving, from the base station and based at least in part on the signaling, an indication of a first set of time division duplex (TDD) configurations comprising a plurality of TDD configurations, a second set of slot format indicators comprising a plurality of slot format indicators, or both, for communications between the base station and the UE;
    selecting, based at least in part on the location of the UE or the measured reference signal receive power, a TDD configuration from the first set, a slot format indicator from the second set, or both; and
    communicating, based at least in part on the selecting, with the base station according to the TDD configuration, the slot format indicator, or both.

2. The method of claim 1, further comprising:
    transmitting, to the base station, signaling indicating a cross link interference associated with communications from the base station, the wireless device, or both, wherein receiving the indication of at least one of the first set of TDD configurations and the second set of slot format indicators is based at least in part on transmitting the signaling indicating the cross link interference.

3. The method of claim 1, further comprising:
    receiving, from the base station, signaling indicating an updated TDD configuration from the first set, indicating an updated slot format indicator from the second set, or both; and
    communicating with the base station according to the updated TDD configuration, the updated slot format indicator, or both.

4. The method of claim 3, further comprising:
    switching from communicating with the base station according to the TDD configuration, the slot format indicator, or both to communicating with the base station according to the updated TDD configuration, the updated slot format indicator, or both at a time indicated by a configured time period after receiving the signaling indicating the updated TDD configuration, the updated slot format indicator, or both.

5. The method of claim 3, wherein receiving the signaling comprises:
    receiving, from the base station, the signaling via downlink control information or via a medium access control-control element.

6. The method of claim 1, wherein each TDD configuration within the first set of TDD configurations is broadcast by the base station to the wireless device.

7. The method of claim 1, further comprising:
    transmitting signaling indicating a first set of reference signal receive power thresholds each associated with a respective one of the first set of TDD configurations, one of the second set of slot format indicators, or both and indicating a second set of location thresholds each associated with a respective one of the first set of TDD configurations, one of the second set of slot format indicators, or both; and
    identifying that the measured reference signal receive power satisfies a reference signal receive power threshold from the first set of reference signal receive power thresholds that is associated with the TDD configuration or the slot format indicator or that the location of the UE satisfies a location threshold from the second set of slot format indicators that is associated with the TDD configuration or the slot format indicator, wherein the selecting is based at least in part on the identifying.

8. The method of claim 7, further comprising:
    transmitting, to the base station, a report indicating that the measured reference signal receive power satisfies the reference signal receive power threshold or that the location of the UE satisfies the location threshold from the second set of slot format indicators, wherein the communicating is based at least in part on transmitting the report.

9. The method of claim 1, further comprising:
    selecting, based at least in part on an updated location of the UE or an updated measured reference signal receive power, an updated TDD configuration from the first set, an updated slot format indicator from the second set, or both;
    transmitting, to the base station, signaling indicating the selected updated TDD configuration, the updated slot format indicator, or both based at least in part on the selecting; and
    communicating with the base station according to the updated TDD configuration, the updated slot format indicator, or both based at least in part on transmitting the signaling indicating the updated TDD configuration, the updated slot format indicator, or both.

10. The method of claim 9, further comprising:
    switching from communicating with the base station according to the TDD configuration, the slot format indicator, or both to communicating with the base station according to the updated TDD configuration, the updated slot format indicator, or both at a time indicated by a configured time period after transmitting the signaling indicating the selected updated TDD configuration, the updated slot format indicator, or both.

11. The method of claim 1, further comprising:
    transmitting, to the base station based at least in part on the communicating with the base station, signaling indicating an updated location of the UE or indicating an updated measured reference signal receive power associated with communications from the base station, the wireless device, or both;

receiving, from the base station, at least one of an indication of an updated TDD configuration and an updated slot format indicator for communications between the base station and the UE based at least in part on the updated location or the updated measured reference signal receive power; and communicating with the base station according to the updated TDD configuration, the updated slot format indicator, or both.

12. The method of claim 1, wherein:
the base station corresponds to a serving cell of the UE; and
the wireless device corresponds to a neighboring cell of the UE.

13. The method of claim 1, wherein communicating with the base station comprises:
communicating with the base station according to a full-duplex mode.

14. A method for wireless communication at a first network entity, comprising:
receiving, from a second network entity, signaling indicating a set of resource configurations comprising a plurality of resource configurations;
receiving, from the second network entity, a first set of reference signal receive power thresholds each associated with a respective one of the set of resource configurations, a second set of location thresholds each associated with a respective one of the set of resource configurations, or both;
comparing a measured reference signal receive power to the first set of reference signal receive power thresholds, a location of a wireless device to the second set of location thresholds, or both;
selecting, based at least in part on the comparison between at least one of a measured reference signal receive power indicated by the wireless device and the first set of reference signal receive power thresholds, the location of the wireless device and the second set of location thresholds, or both, a resource configuration from the set of resource configurations for communications with the wireless device; and
communicating with the wireless device according to the selected resource configuration.

15. The method of claim 14, wherein each resource configuration within the set of resource configurations is associated with the first network entity and the second network entity.

16. The method of claim 14, further comprising:
receiving, from the second network entity, signaling indicating a set of thresholds each associated with a respective one of the set of resource configurations; and
comparing a channel metric corresponding to communications with the wireless device to the set of thresholds, wherein the selecting is based at least in part on the comparing.

17. The method of claim 16, wherein the channel metric comprises a cross link interference, an uplink transmission power, a downlink transmission power, or a combination thereof.

18. The method of claim 14, wherein the set of resource configurations comprises at least one of a first set of TDD configurations, a second set of slot format indicators, and a third set of distributed unit resource configurations.

19. The method of claim 14, wherein:
the first network entity corresponds to a distributed unit or an integrated access and backhaul node; and
the second network entity corresponds to a centralized unit.

20. The method of claim 14, wherein communicating with the wireless device comprises:
communicating with the wireless device according to a full-duplex mode.

21. A method for wireless communication at a base station, comprising:
receiving, from a user equipment (UE), signaling indicating a location of the UE and indicating a measured reference signal receive power associated with communications from the base station, a wireless device, or both;
transmitting, to the UE based at least in part on the signaling, an indication of a first set of time division duplex (TDD) configurations comprising a plurality of TDD configurations, a second set of slot format indicators comprising a plurality of slot format indicators, or both, for communications between the base station and the UE; and
communicating with the UE according to a TDD configuration from the first set, a slot format indicator from the second set, or both based at least in part on the location of the UE or the measured reference signal receive power.

22. The method of claim 21, further comprising:
receiving, from the UE, signaling indicating a cross link interference associated with communications from the base station, the wireless device, or both, wherein transmitting the indication of at least one of the first set of TDD configurations and the second set of slot format indicators is based at least in part on receiving the signaling indicating the cross link interference.

23. The method of claim 21, further comprising:
transmitting, to the UE, signaling indicating an updated TDD configuration from the first set, an updated slot format indicator from the second set, or both; and
communicating with the UE according to the updated TDD configuration, the updated slot format indicator, or both based at least in part on transmitting the signaling indicating the updated TDD configuration, the updated slot format indicator, or both.

24. The method of claim 21, further comprising:
transmitting signaling indicating a first set of reference signal receive power thresholds each associated with a respective one of the first set of TDD configurations, one of the second set of slot format indicators, or both and indicating a second set of location thresholds each associated with a respective one of the first set of TDD configurations, one of the second set of slot format indicators, or both, wherein communicating with the UE is based at least in part on transmitting the signaling indicating the first set of reference signal receive power thresholds and indicating the second set of location thresholds.

25. The method of claim 21, further comprising:
receiving, from the UE, signaling indicating an updated TDD configuration from the first set, an updated slot format indicator from the second set, or both; and
communicating with the UE according to the updated TDD configuration, the updated slot format indicator, or both based at least in part on receiving the signaling indicating the updated TDD configuration, the updated slot format indicator, or both.

26. The method of claim 21, further comprising:
receiving, from the UE based at least in part on the communicating with the UE, signaling indicating an updated location of the UE or indicating an updated measured reference signal receive power associated with communications from the base station, the wireless device, or both;
transmitting, to the UE, at least one of an indication of an updated TDD configuration and an updated slot format indicator for communications between the base station and the UE based at least in part on the updated location or the updated measured reference signal receive power; and
communicating with the UE according to the updated TDD configuration, the updated slot format indicator, or both.

27. An apparatus for wireless communication at a user equipment (UE), comprising:
a processor;
memory coupled with the processor; and
instructions stored in the memory and executable by the processor to cause the apparatus to:
transmit, to a base station, signaling indicating a location of the UE and indicating a measured reference signal receive power associated with communications from the base station, a wireless device, or both;
receive, from the base station and based at least in part on the signaling, an indication of a first set of time division duplex (TDD) configurations comprising a plurality of TDD configurations, a second set of slot format indicators comprising a plurality of slot format indicators, or both, for communications between the base station and the UE;
select, based at least in part on the location of the UE or the measured reference signal receive power, a TDD configuration from the first set, a slot format indicator from the second set, or both; and
communicate, based at least in part on the selecting, with the base station according to the TDD configuration, the slot format indicator, or both.

* * * * *